(12) United States Patent
Waki et al.

(10) Patent No.: US 10,498,140 B2
(45) Date of Patent: *Dec. 3, 2019

(54) POWER MANAGEMENT METHOD, POWER MANAGEMENT SYSTEM, AND POWER SUPPLY APPARATUS

(71) Applicant: PANASONIC INTELLECTUAL PROPERTY MANAGEMENT CO., LTD., Osaka-shi, Osaka (JP)

(72) Inventors: Yuki Waki, Osaka (JP); Kazuya Ohshima, Osaka (JP); Hideshi Aoki, Osaka (JP); Haruka Nakasone, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 114 days.

This patent is subject to a terminal disclaimer.

(21) Appl. No.: 15/848,596

(22) Filed: Dec. 20, 2017

(65) Prior Publication Data
US 2018/0115158 A1 Apr. 26, 2018

Related U.S. Application Data

(63) Continuation of application No. 14/924,713, filed on Oct. 28, 2015, now Pat. No. 9,887,540.

(30) Foreign Application Priority Data

Nov. 12, 2014 (JP) .................................. 2014-230148
Jul. 27, 2015 (JP) .................................. 2015-148150

(51) Int. Cl.
*H02J 3/00* (2006.01)
*G06Q 50/06* (2012.01)
(Continued)

(52) U.S. Cl.
CPC ................ *H02J 3/00* (2013.01); *G06Q 50/06* (2013.01); *H02J 3/008* (2013.01); *H02J 3/383* (2013.01);
(Continued)

(58) Field of Classification Search
CPC .. H02J 3/00; H02J 3/003; H02J 3/383; G06Q 50/06; G06Q 10/06
See application file for complete search history.

(56) References Cited

U.S. PATENT DOCUMENTS 9,887,540 B2 * 2/2018 Waki ........................ H02J 3/00
2004/0206813 A1 10/2004 Brobeck
(Continued)

FOREIGN PATENT DOCUMENTS

JP 2011-186721 9/2011
JP 2013-102673 5/2013

*Primary Examiner* — Vincent H Tran
(74) *Attorney, Agent, or Firm* — Greenblum & Bernstein, P.L.C.

(57) ABSTRACT

A power management method includes: receiving a surplus power value, indicating an amount of surplus power; receiving an inquiry regarding a power supply using the surplus power in a first time period; and issuing, in accordance with the inquiry, first power identification information in association with an accumulated value of the amount of surplus power corresponding to the first time period, the first power identification information allowing a power supply apparatus to supply power using the surplus power corresponding to the first time period. When a first power supply request associated with the first power identification information and requesting a power supply to a first load is received, the power supply apparatus is caused to supply an amount of power equal to or smaller than the accumulated value of the amount of surplus power, to the first load, as first power that does not cause a fee charging process.

20 Claims, 22 Drawing Sheets

(51) Int. Cl.
*H02J 3/38* (2006.01)
*H02J 13/00* (2006.01)

(52) U.S. Cl.
CPC ......... *H02J 13/0006* (2013.01); *Y02E 10/563* (2013.01); *Y02E 40/72* (2013.01); *Y04S 10/123* (2013.01); *Y04S 50/10* (2013.01)

(56) References Cited

U.S. PATENT DOCUMENTS

| | | | |
|---|---|---|---|
| 2010/0049533 A1 | 2/2010 | Ferro | |
| 2013/0006831 A1* | 1/2013 | Mise | G06Q 10/06 705/37 |
| 2013/0113413 A1 | 5/2013 | Harty | |
| 2016/0062380 A1* | 3/2016 | Schwarz | G05F 1/66 700/295 |
| 2016/0232555 A1* | 8/2016 | Satou | G06Q 50/06 |
| 2016/0241033 A1* | 8/2016 | Nakamura | H02J 3/005 |

* cited by examiner

| CONTRACT ID | METER ID | MEASUREMENT PERIOD START TIME | MEASUREMENT PERIOD END TIME | AMOUNT OF SURPLUS POWER [Wh] |
|---|---|---|---|---|
| 00001 | 123456789 | 04/01/2015 10:30:00 | 04/01/2015 10:35:00 | 340 |
| 00001 | 123456789 | 04/01/2015 10:35:00 | 04/01/2015 10:40:00 | 426 |

| POWER ID | EXPIRATION TIME | AMOUNT OF SURPLUS POWER [Wh] | AMOUNT OF POWER AVAILABLE [Wh] | RECORD REGISTRATION TIME |
|---|---|---|---|---|
| 1504011040766 | 04/01/2015 11:00:00 | 766 | 766 | 04/01/2015 10:40:00 |
| 1504011040766 | 04/01/2015 11:00:00 | 766 | 266 | 04/01/2015 10:50:00 |

| POWER ID | POWER SUPPLY START TIME | POWER SUPPLY END TIME | AMOUNT OF POWER SUPPLIED [Wh] | POWER SUPPLY APPARATUS ID | RECORD REGISTRATION TIME |
|---|---|---|---|---|---|
| 1504011040766 | 04/01/2015 10:45:00 | 04/01/2015 10:50:00 | 500 | abcde98765 | 04/01/2015 10:50:00 |

| CONTRACT ID | METER ID | POWER SUPPLY PERIOD START TIME | POWER SUPPLY PERIOD END TIME | AMOUNT OF POWER PURCHASED [Wh] | AMOUNT OF POWER SOLD [Wh] |
|---|---|---|---|---|---|
| 00001 | 123456789 | 04/01/2015 10:00:00 | 04/01/2015 10:30:00 | 0 | 1000 |
| 00001 | 234567890 | 04/01/2015 10:00:00 | 04/01/2015 10:30:00 | 50 | 0 |
| 00001 | 123456789 | 04/01/2015 10:30:00 | 04/01/2015 11:00:00 | 0 | 2400 |
| 00001 | 123456789 | 04/01/2015 11:00:00 | 04/01/2015 11:30:00 | 0 | 1000 |
| 00001 | 123456789 | ... | ... | ... | ... |

| CONTRACT ID | POWER SUPPLY APPARATUS ID | POWER SUPPLY PERIOD START TIME | POWER SUPPLY PERIOD END TIME | AMOUNT OF POWER SUPPLIED [Wh] | AMOUNT OF SURPLUS POWER SUPPLIED [Wh] | AMOUNT OF GRID POWER SUPPLIED [Wh] |
|---|---|---|---|---|---|---|
| 00001 | abcde98765 | 04/01/2015 10:45:00 | 04/01/2015 11:00:00 | 500 | 500 | 0 |
| 00001 | bcdef87654 | 04/01/2015 11:20:00 | 04/01/2015 11:50:00 | 3000 | 1000 | 2000 |
| 00001 | ... | ... | ... | ... | ... | ... |

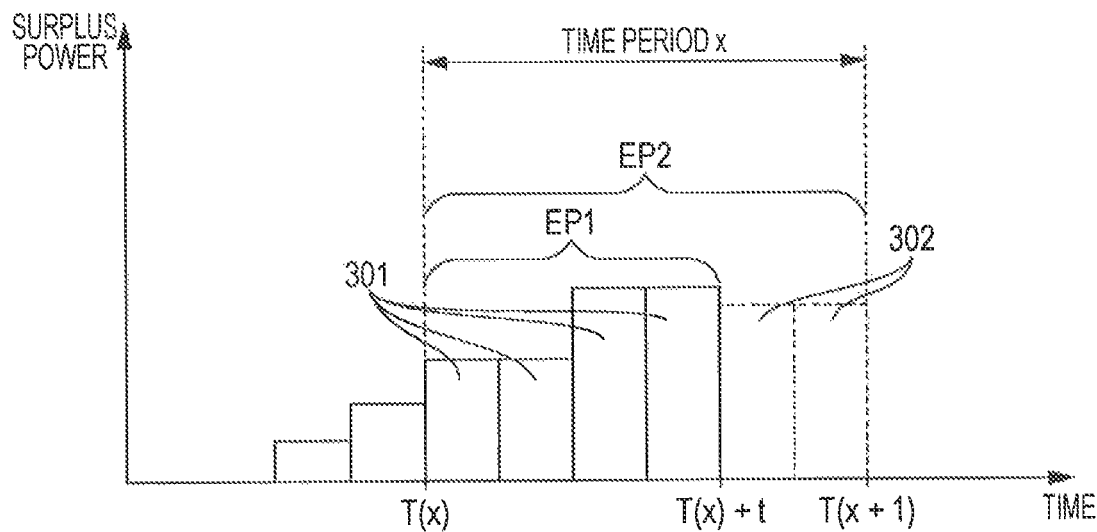

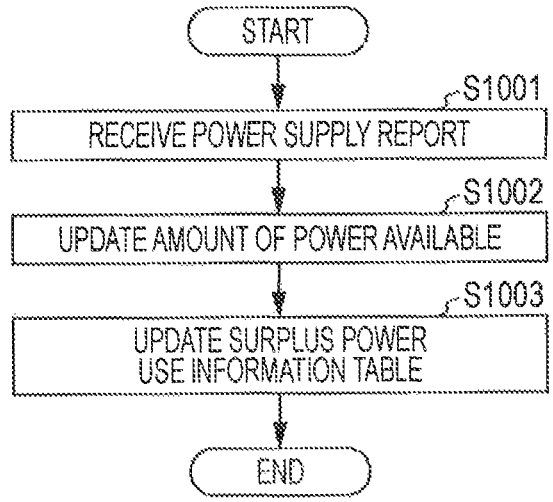
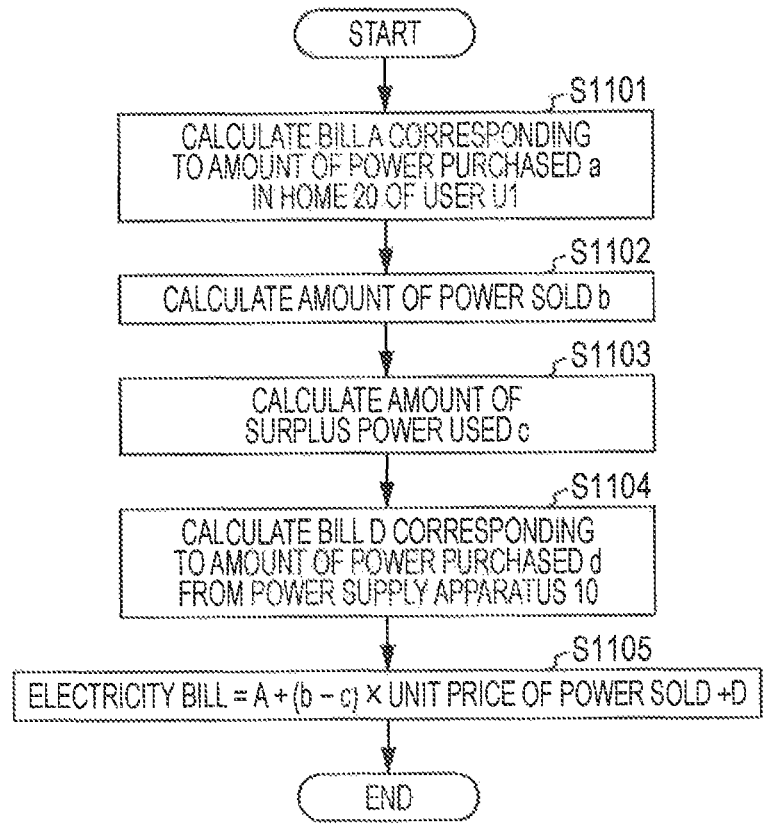

POWER MANAGEMENT METHOD, POWER MANAGEMENT SYSTEM, AND POWER SUPPLY APPARATUS

CROSS REFERENCE TO RELATED APPLICATION

This application is a Continuation Application of U.S. application Ser. No. 14/924,713, filed Oct. 28, 2015, which claims priority to Japanese Patent Application No. 2015-148150, filed Jul. 27, 2015, and 2014-230148, filed Nov. 12, 2014, the entire contents of which are hereby incorporated by reference.

BACKGROUND

1. Technical Field

The present disclosure relates to a power management method, a power management system, and a power supply apparatus.

2. Description of the Related Art

Power generated using solar energy and the like are currently consumed by load apparatuses or supplied to a power system.

An apparatus that supplies power from a vehicle to power equipment outside the vehicle using a storage battery mounted on the vehicle and then supplies an amount of power corresponding to the amount of the aforementioned power from the power equipment to the vehicle has been disclosed (refer to Japanese Unexamined Patent Application Publication No. 2013-102673).

SUMMARY

In the power management system in an example of the related art, however, surplus power is always sold, and it is difficult for users to make wider use of surplus power.

One nonlimiting and exemplary embodiment provides a power management method by which it is possible to make wider use of surplus power.

In one general aspect, the techniques disclosed here feature a power management method used in a power management system including a power generation apparatus corresponding to first user identification information, a first load apparatus used by a user corresponding to the first user identification information, and a power supply apparatus capable of supplying power to the first load apparatus and installed in a place different from a place where the power generation apparatus is installed. The method includes receiving, from a meter that measures amount of surplus power, which is, in power generated by the power generation apparatus, power supplied from the power generation apparatus to a power system, a surplus power value indicating the amount of surplus power, receiving, from a first communication terminal used by the user corresponding to the first user identification information, an inquiry about power supply in which the surplus power is used in a first time period that lasts a certain unit time, the inquiry being associated with the first user identification information, issuing, in accordance with the inquiry, first power identification information for validating power supply performed by the power supply apparatus using the surplus power corresponding to the first time period for an accumulated value of the amount of surplus power corresponding to the first time period, transmitting the first power identification information and the accumulated value of the amount of surplus power corresponding to the first time period to the first communication terminal, and causing the power supply apparatus that has received a first power supply request, which is associated with the first power identification information, indicating that power is to be supplied to the first load apparatus to supply an amount of first power equal to or smaller than the amount of surplus power to the first load apparatus as power that does not cause a charging process.

The power management method in the present disclosure makes it possible to make wider use of surplus power.

It should be noted that general or specific embodiments may be implemented as a system, a method, an integrated circuit, a computer program, a recording medium such as a computer-readable compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating a surplus power information table according to the first embodiment;

FIG. 6 is a diagram illustrating a power identifier (ID) management able according to the first embodiment;

FIG. 7 is a diagram illustrating a surplus power use information table according to the first embodiment;

FIG. 8 is a diagram illustrating a power information management table according to the first embodiment;

FIG. 9 is a diagram illustrating a power supply apparatus use information table according to the first embodiment;

FIG. 10 is a diagram illustrating surplus power according to the first embodiment;

FIG. 11 is a diagram illustrating an inquiry about the possibility of power supply and a response to the inquiry according to the first embodiment;

FIG. 20 is a flowchart illustrating a process for updating the amount of surplus power used performed by the power management apparatus according to the first embodiment;

FIG. 21 is a flowchart illustrating a process for calculating an electricity bill in a settlement process according to the first embodiment;

DETAILED DESCRIPTION

Figure 1:
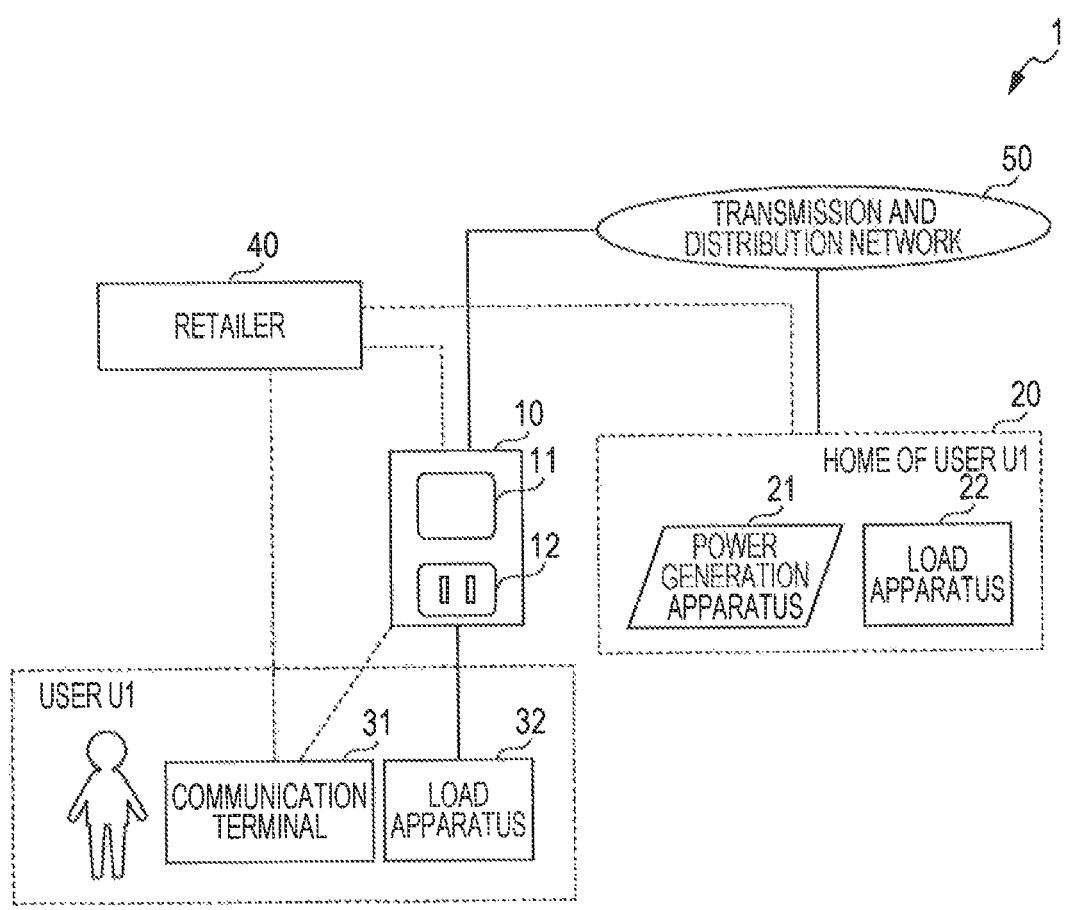
FIG. 1 is an overview of the configuration of a power management system according to a first embodiment.

Underlying Knowledge Forming Basis of the Present Disclosure

The present inventor has found that the following problem occurs in the transmission of power described in "Description of the Related Art".

After the power liberalization in Japan in 2016, consumers will be able to select any power retailers. Because regulations on electricity bills will be removed, retailers need to propose attractive contracts or rate plans that are useful to consumers.

Retailers will make contracts not only with conventional power supply points (households and buildings) but also with individuals. In addition, a contract will be possible that specifies that if a consumer receives power with a device (a mobile device, an electric vehicle (EV), or the like) at a place other than the consumer's home (e.g., a public charging spot), the consumer pays for the power with a single transaction along with power consumed in the consumer's home.

On the other hand, power generated by consumers using renewable energy such as solar energy is now purchased by power companies for premium prices in order to tactically popularize such a type of power generation. As solar power generation equipment becomes popular, however, the prices are falling. In the future, the prices can be equal to or lower than those of grid power.

In such a situation, consumers might not sell surplus power caused by home solar power systems to power companies but might want to use the surplus power themselves or provide (or present) the surplus power for others such as friends or relatives.

In the power management system in the example of the related art, however, surplus power is always sold, and it is difficult for users to make wider use of surplus power.

The present disclosure provides a power management system capable of making wider use of surplus power.

In order to solve such a problem, a power management method according to an aspect of the present disclosure is a power management method used in a power management system including a power generation apparatus corresponding to first user identification information, a first load apparatus used by a user corresponding to the first user identification information, and a power supply apparatus capable of supplying power to the first load apparatus and installed in a place different from a place where the power generation apparatus is installed. The method includes receiving, from a meter that measures amount of surplus power, which is, in power generated by the power generation apparatus, power supplied from the power generation apparatus to a power system, a surplus power value indicating the amount of surplus power, receiving, from a first communication terminal used by the user corresponding to the first user identification information, an inquiry about power supply in which the surplus power is used in a first time period that lasts a certain unit time, the inquiry being associated with the first user identification information, issuing, in accordance with the inquiry, first power identification information for validating power supply performed by the power supply apparatus using the surplus power corresponding to the first time period for an accumulated value of the amount of surplus power corresponding to the first time period, transmitting the first power identification information and the accumulated value of the amount of surplus power corresponding to the first time period to the first communication terminal, and causing the power supply apparatus that has received a first power supply request, which is associated with the first power identification information, indicating that power is to be supplied to the first load apparatus to supply an amount of first power equal to or smaller than the amount of surplus power to the first load apparatus as power that does not cause a charging process.

According to the above aspect, in the power management system, the surplus power caused in a home of a user (consumer) is supplied to the power system (reverse flow) whereas the power system supplies power at a place different from the user's home. As a result, the user can not only sell the surplus power but also receive an amount of power corresponding to the amount of surplus power at another place. The power management system can thus make wider use of surplus power. In other words, since the user consumes the surplus power at a place different from his/her home, the power management system can balance the amount of power consumed and the amount of power supplied with each other more appropriately in the first time period.

The first power supply request may be, for example, input from the first communication terminal to the power supply apparatus.

According to the above aspect, in the power management system, the power supply apparatus receives the first power supply request from the first communication terminal. The power management system can therefore receive the first power supply request more securely using the first communication terminal.

The surplus power value may be, for example, periodically received from the meter. After the inquiry is received, surplus power values may be accumulated from a start of the first time period including a reception time, which is a time at which the inquiry has been received, to the reception time to generate an accumulated value of the amount of surplus power corresponding to the first time period.

According to the above aspect, in the power management system, the accumulated value of the amount of surplus power can be specifically calculated using the surplus power value periodically transmitted from the meter.

After the inquiry is received, for example, the meter may be requested to output surplus power values corresponding to the first time period including a reception time, which is a time at which the inquiry has been received. After the surplus power values corresponding to the first time period are received from the meter, the surplus power values corresponding to the first time period may be accumulated to generate an accumulated value of the amount of surplus power corresponding to the first time period.

According to the above aspect, in the power management system, the accumulated value of the amount of surplus power can be specifically calculated using the surplus power value periodically transmitted from the meter.

The first power supply request may include, for example, a value indicating amount of power to be supplied to the first load apparatus.

According to the above aspect, since the power management apparatus receives the power supply request including the amount of power to be supplied in the power management system, the power management apparatus can determine whether an amount of power corresponding the amount of power included in the power supply request can be supplied.

If the accumulated value of the amount of surplus power corresponding to the first time period is equal to or smaller than a certain minimum value, for example, control may be performed such that the first power identification information is not issued or associated with the accumulated value of the amount of surplus power corresponding to the first time period.

According to the above aspect, if the amount of power that can be supplied from the power supply apparatus is equal to or smaller than the certain minimum value, the power management apparatus can prohibit the power supply apparatus from supply power by controlling the issuance of the power ID.

If the accumulated value of the amount of surplus power corresponding to the first time period is equal to or smaller than a certain minimum value, for example, control may be performed such that the first power identification information and the accumulated value are not transmitted to the first communication terminal in accordance with the inquiry.

According to the above aspect, if the amount of power that can be supplied from the power supply apparatus is equal to or smaller than the certain minimum value, the power management apparatus can prohibit the power supply apparatus from supplying power by controlling the issuance of the power ID.

If the accumulated value of the amount of surplus power corresponding to the first time period is equal to or smaller than a certain minimum value, for example, control may be performed such that a notification indicating that the accumulated value of the amount of surplus power corresponding to the first time period is equal to or smaller than the certain minimum value is transmitted to the first communication terminal in accordance with the inquiry.

According to the above aspect, the power management apparatus can notify the user that the amount of power that can be supplied from the power supply apparatus is equal to or smaller than the certain minimum value by transmitting the notification to the first communication terminal.

The method further may include, for example, receiving, from the power supply apparatus, an inquiry request including a value indicating amount of power to be supplied to the first load apparatus, and outputting, if the value included in the inquiry request exceeds the accumulated value of the amount of surplus power corresponding to the first time period, an instruction to prohibit the power supply apparatus from supplying power to the first load apparatus.

According to the above aspect, the power management apparatus can prohibit the power supply apparatus from supplying power using the instruction to prohibit the power supply apparatus from supplying an amount of power larger than the amount of surplus power.

The method further may include, for example, receiving, from the power supply apparatus, an inquiry request including a value indicating amount of power to be supplied to the first load apparatus, and causing, if the value included in the inquiry request exceeds the accumulated value of the amount of surplus power corresponding to the first time period, the power generation apparatus to supply an amount of first power corresponding to the accumulated value of the amount of surplus power corresponding to the first time period to the first load apparatus as power that does not cause a charging process.

According to the above aspect, the power management apparatus can supply an amount of power equal to or smaller than the amount of surplus power in response to the request to supply an amount of power larger than the amount of surplus power.

After the first time period ends, for example, management may be performed such that power supply performed by the power supply apparatus using the surplus power corresponding to the first time period on the basis of the first power identification information is invalidated.

According to the above aspect, the power management system can perform power supply based on the first identification information only in the first time period. The power management system can therefore make wider use of surplus power without significantly disrupting power supply-demand balance in a transmission and distribution network.

The power management system further may include, for example, a second load apparatus, which is different from the first load apparatus and installed in the same building as the power generation apparatus. Power obtained by subtracting power used by the second load apparatus from the power generated by the power generation apparatus is determined as the surplus power.

According to the above aspect, the power management apparatus can specifically calculate the amount of surplus power using the amount of power generated by the power generation apparatus and the amount of power consumed by the second load apparatus.

If the power generation apparatus has not obtained the first power identification information, for example, the power supply apparatus may supply second power that causes a charging process to the first load apparatus.

According to the above aspect, in the power management system, the power supply apparatus can supply either power that causes a charging process or power that does not cause a charging process on the basis of whether the first power identification information is present. Since the power management system performs management such that the surplus power offsets the power supplied from the power supply apparatus, the user need not pay for the power supplied from the power supply apparatus. The user can therefore make wider use of surplus power without paying extra money.

The power supply apparatus may include, for example, a receiver used for a process for paying money for supplied power. The method may further include performing control, if the second power has been supplied, such that the receiver accepts the process for paying money, and control, if the first power has been supplied, such that the receiver prohibits the process for paying money.

According to the above aspect, the power management system determines whether to accept the process for paying money in accordance with whether the supplied power causes a charging process. The power management system can therefore appropriately perform the process for paying money for the supplied power.

The method further may include, for example, performing a process for calculating a price corresponding to the amount of surplus power. If the power supply apparatus has supplied the first power to the first load apparatus, a process for calculating a price corresponding to amount of power obtained by subtracting amount of first power supplied from the accumulated value of the amount of surplus power may be performed in the calculation process.

According to the above aspect, the power management system provides, for the user, the price corresponding to the amount of power obtained by subtracting the amount of power supplied from the power supply apparatus from the price corresponding to the amount of surplus power. The user can therefore make wider use of surplus power without paying extra money.

The first communication terminal may transmit, for example, the first power identification information and the accumulated value of the amount of surplus power corresponding to the first time period to a second communication terminal used by a user corresponding to second user identification information different from the first user identification information. If the second communication terminal has transmitted, to the power supply apparatus, a second power supply request indicating that power is to be supplied to a third load apparatus, which is used by the user corresponding to the second user identification information and different from the first load apparatus, the power supply apparatus may supply an amount of first power equal to or smaller than the amount of surplus power to the third load apparatus as power that does not cause a charging process.

According to the above aspect, in the power management system, the surplus power caused in a home of a first user (the user corresponding to the first user identification information) is supplied to the power system (reverse flow) whereas a second user (the user corresponding to the second user identification information) that does not own a power generation apparatus can receive power from the power system. Even users who do not own a power generation apparatus can therefore use surplus power.

The first power identification information and temporary second power identification information different from the first power identification information may be, for example, associated with the accumulated value of the amount of surplus power corresponding to the first time period and issued in accordance with the inquiry. The first power identification information, the second power identification information, and the accumulated value of the amount of surplus power corresponding to the first time period may be transmitted to the first communication terminal. The first communication terminal may transmit the second power identification information and the accumulated value of the amount of surplus power to a second communication terminal used by a user corresponding to second user identification information different from the first user identification information. The second communication terminal may transmit, to the power supply apparatus, a second power supply request indicating that power is to be supplied to a second load apparatus, which is used by the user corresponding to the second user identification information and different from the first load apparatus. If the power supply apparatus has supplied an amount of first power equal to or smaller than the amount of surplus power to the second load apparatus as power that does not cause a charging process, the first power may be prohibited from being supplied to the first load apparatus.

According to the above aspect, in the power management system, the second user is allowed to supply power to his/her load apparatus using the second identification information whereas the first user is prohibited from supplying power to his/her load apparatus. That is, the power management system can appropriately transfer or move identification information from the first user to the second user.

The accumulated value of the amount of surplus power corresponding to the first time period may include, for example, a value obtained by adding surplus power values corresponding to a period from a start of the first time period including a reception time, which is a time at which the inquiry has been received, to the reception time to an estimated accumulated value of the amount of surplus power from the reception time to an end of the first time period.

According to the above aspect, in the power management system, the sum of the surplus power actually caused in the time period and the surplus power estimated to be caused in the time period can be supplied to the load apparatus. As a result, it is possible to avoid increasing a power procurement cost of a retailer.

A power management system according to an aspect of the present disclosure is a power management system including a power generation apparatus corresponding to first user identification information, a first load apparatus used by a user corresponding to the first user identification information, and a power supply apparatus capable of supplying power to the first load apparatus and installed in a place different from the power generation apparatus. The power management system including one or more memories; and circuitry operative to: receive; from a meter that measures amount of surplus power, which is, in power generated by the power generation apparatus, power supplied from the power generation apparatus to a power system, a surplus power value indicating the amount of surplus power, receive, from a first communication terminal used by the user corresponding to the first user identification information, an inquiry about power supply in which the surplus power is used in a first time period that lasts a certain unit time, the inquiry being associated with the first user identification information, issue, in accordance with the inquiry, first power identification information for validating power supply performed by the power supply apparatus using the surplus power corresponding to the first time period for an accumulated value of the amount of surplus power corresponding to the first time period, transmit the first power identification information and the accumulated value of the amount of surplus power corresponding to the first time period to the first communication terminal, and cause the power supply apparatus that has received, from the first communication terminal, a first power supply request, which is associated with the first power identification information, indicating that power is to be supplied to the first load apparatus to supply an amount of first power equal to or smaller than the amount of surplus power to the first load apparatus as power that does not cause a charging process.

According to the above aspect, the same advantageous effects as those produced by the power management method can be produced.

A power supply apparatus according to an aspect of the present disclosure is a power supply apparatus connected to the power management system.

According to the above aspect, the same advantageous effects as those produced by the power management method can be produced.

It should be noted that general or specific embodiments may be implemented as a system, a method, an integrated circuit, a computer program, a storage medium such as a CD-ROM, or any selective combination thereof.

Embodiments will be specifically described hereinafter with reference to the drawings.

It should be noted that the following embodiments are general or specific examples. Values, shapes, materials, components, positions at which the components are arranged, how the components are connected to one another, steps, the order of steps, and the like are examples, and do not limit the present disclosure. Components in the following description that are not described in the independent claims, which define broadest concepts, are described as arbitrary components.

First Embodiment

In a first embodiment, a power management system will be described capable of making wider use of surplus power caused in a user's home by consuming the surplus power at a place different from the user's home.

First, a situation in which the power management system according to the present embodiment manages power will be described using an example. Power management performed by the power management system according to the present embodiment, however, is not limited to this example.

The user drives an EV to go to a supermarket and charges the EV during shopping. A power supply apparatus for charging EVs is installed in a parking lot of the supermarket, and the user charges the EV using the power supply apparatus. A power generation apparatus is installed in the user's home and generating power. While the user is charging the EV, surplus power is caused in the user's home because the amount of power consumed by a load apparatus in the user's home is smaller than the amount of power generated. The power management system performs management such that the surplus power caused in the user's home offsets the power supplied to the EV from the power supply apparatus. The power management system that performs such power management will be specifically described hereinafter.

Figure 2:
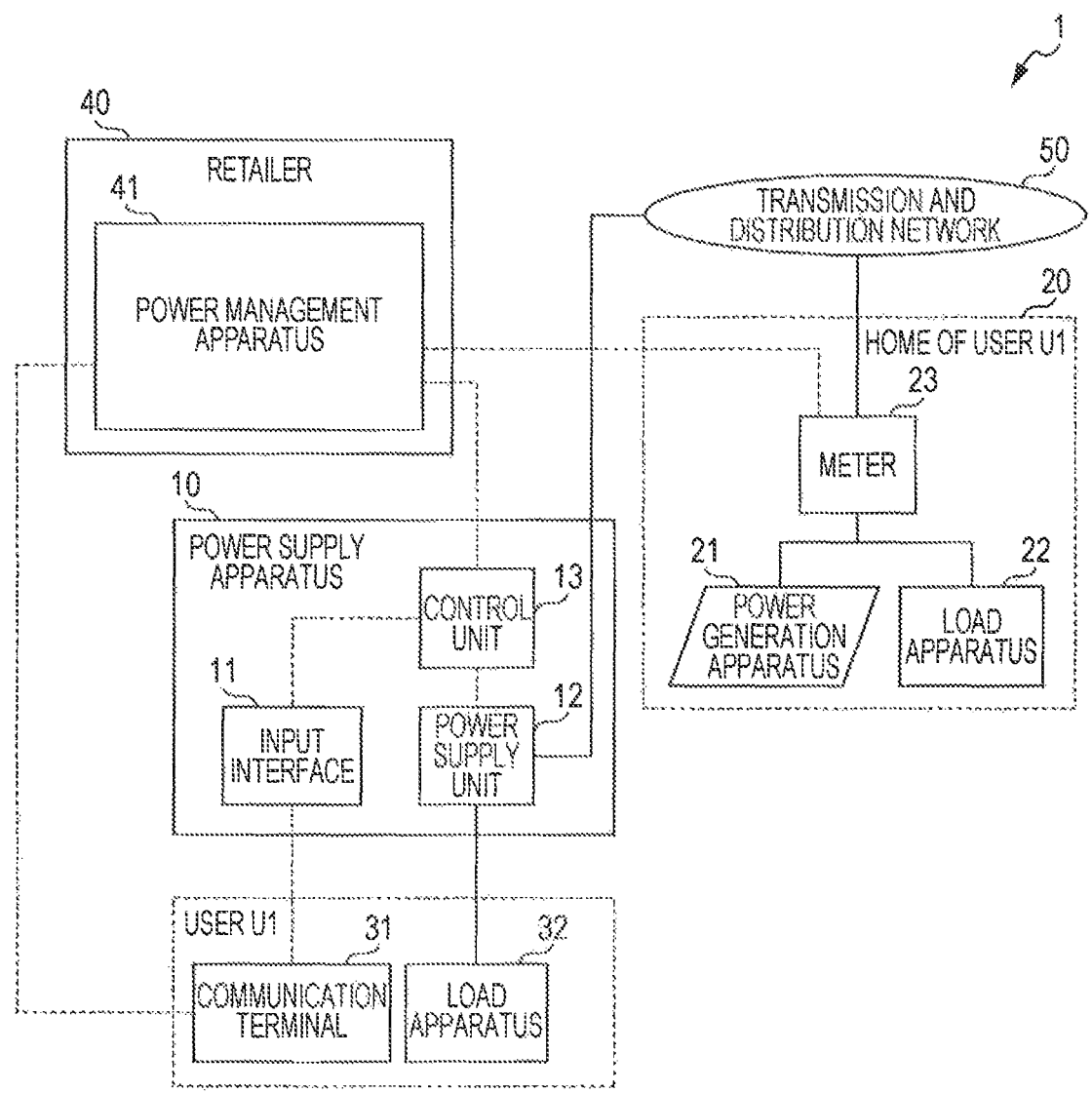
FIG. 2 is a block diagram illustrating the configuration of the power management system according to the first embodiment.

FIG. 1 is an overview of the configuration of a power management system 1 according to the present embodiment. FIG. 2 is a block diagram illustrating the configuration of the power management system 1 according to the present embodiment. In FIG. 1 and other drawings, solid lines indicate transmission of power, and broken lines indicate transmission of information or control. The power management system 1 will be described with reference to these drawings.

As illustrated in FIGS. 1 and 2, the power management system 1 according to the present embodiment includes a power supply apparatus 10, a home 20 of a user U1, a retailer 40, and a transmission and distribution network 50.

The power supply apparatus 10 is connected to the transmission and distribution network 50 and supplies power supplied from the transmission and distribution network 50 to a load apparatus 32. The power supply apparatus 10 holds a power ID of surplus power and supplies an amount of power (also referred to as "first power") equal to or smaller than the amount of the surplus power associated with the held power ID to the load apparatus 32 from the transmission and distribution network 50.

The power supply apparatus 10 includes an input interface 11 and a power supply unit 12.

The input interface 11 is a user interface that receives an operation performed by the user U1 or information. The input interface 11 may be a near field communication port that communicates information with a communication terminal 31 through near field communication or the like, or may be keys or buttons that receive an operation performed by the user U1 when pressed.

The power supply unit 12 is a power output unit that supplies power supplied from the transmission and distribution network 50 to the load apparatus 32. The power supply unit 12 supplies power to the load apparatus 32 connected to the power supply unit 12 on the basis of control performed by a power management apparatus 41. More specifically, the power supply unit 12 supplies an amount of power specified by the power management apparatus 41 to the load apparatus 32.

Even if the power management apparatus 41 does not specify an amount of power, the power supply unit 12 supplies an amount of power (also referred to as "second power") separately specified by the user U1 or another person to the load apparatus 32. A charging process performed by the power management apparatus 41 after the power supply unit 12 supplies the second power, however, is different from a charging process performed after the first power is supplied.

A control unit 13 is a processing unit that controls the operation of the power supply apparatus 10 on the basis of information obtained from the input interface 11 or the like. The control unit 13 supplies power to the load apparatus 32 in accordance with a power supply request received from the communication terminal 31 through the input interface 11. More specifically, if a power ID included in a power supply request is input, the control unit 13 inquires about the power ID included in the power supply request and supplies an amount of power smaller than the amount of surplus power associated with the power ID to the load apparatus 32 from the power supply unit 12.

The power ID used is not limited to one included in a power supply request. The power ID used may be one obtained by another method, or may be one generated by the control unit 13 itself, instead. That is, the control unit 13 may inquire about a power ID held thereby and supply an amount of power smaller than the amount of surplus power associated with the power ID to the load apparatus 32 from the power supply unit 12.

A power generation apparatus 21, a load apparatus 22, and a meter 23 are installed in the home 20 of the user U1.

The power generation apparatus 21 generates power and outputs the generated power to the outside. The power generation apparatus 21 supplies surplus power, which is power generated thereby except for power consumed by the load apparatus 22, that is, power obtained by subtracting the power consumed by the load apparatus 22 from the power generated thereby, to the transmission and distribution network 50 (reverse flow). The power generation apparatus 21 is realized, for example, by a solar panel or a fuel cell. The power generation apparatus 21 includes a device (e.g., a power conditioner) that converts power obtained from a solar panel, a fuel cell, or the like into power that can be supplied to the load apparatus 22 or the like. The power generation apparatus 21 corresponds to a power generation apparatus corresponding to first user identification information.

The load apparatus 22 is an apparatus that consumes power, that is, for example, a home appliance or an EV. The load apparatus 22 may be a storage battery, instead. The load apparatus 22 corresponds to a second load apparatus.

As illustrated in FIG. 2, the meter 23 is mounted on a power line and measures the amount of power that flows therethrough. The meter 23 measures the amount of surplus power (the so-called amount of power sold) supplied to the transmission and distribution network 50 from the home 20 of the user U1 in each measurement period and transmits the amount of power measured to the power management apparatus 41. The measurement period herein refers to a period of a predetermined length in which the meter 23 keeps measuring the amount of power. Although an example in which the length of the measurement period is 5 minutes will be described hereinafter, the length of the measurement period is not limited to this. The length of the measurement period may be arbitrarily determined insofar as the length is shorter than the length of a time period (described later). The length of the measurement may be, for example, 1 minute or 10 minutes. If the power management apparatus 41 inquires of the meter 23 about the amount of power in a certain period in the past or present, the meter 23 transmits a value indicating the amount of power in the certain period in response to the inquiry.

The user U1 stays near the power supply apparatus 10 installed in a place different from the home 20. The user U1 owns the communication terminal 31 and the load apparatus 32.

The communication terminal 31 communicates with the power supply apparatus 10 and the power management apparatus 41 on the basis of operations performed by the user U1. More specifically, the communication terminal 31 communicates with the power management apparatus 41 to inquire about the possibility of power supply and obtain a power ID necessary to supply power from the power supply apparatus 10. The communication terminal 31 communicates with the power supply apparatus 10 to transmit the power ID to the power supply apparatus 10 and supply power to the load apparatus 32 from the power supply apparatus 10. The communication terminal 31 is, for example, a smartphone, a mobile phone terminal, a personal computer (PC), or the like.

The load apparatus 32 is an electric device owned or carried by the user U1. The load apparatus 32 receives power from the power supply apparatus 10 if the communication terminal 31 transmits a power ID to the power supply apparatus 10. The load apparatus 32 is, for example, a mobile terminal, an EV, or the like. The load apparatus 32 may be the communication terminal 31, instead. The load apparatus 32 may be any electric device used by the user U1, and it does not matter whether the user U1 has the ownership of the electric device. The load apparatus 32 corresponds to a first load apparatus.

The retailer 40 is a power retailer that makes money by supplying power to consumers. The retailer 40 makes a power supply contract with the user U1 using the power management apparatus 41 and charges the user U1 a price corresponding to the amount of power used by the load apparatus 22 in the home 20 of the user U1 and the amount of power used by the load apparatus 32 through the power supply apparatus 10.

The power management apparatus 41 obtains the amount of surplus power supplied in a certain period from the meter 23 of the home 20 of the user U1 in accordance with an inquiry from the communication terminal 31 about the possibility of power supply in order to identify surplus power caused in the certain period. The power management apparatus 41 then generates a power ID for uniquely identifying the identified surplus power and transmits the generated power ID to the communication terminal 31. The power management apparatus 41 may periodically obtain the amount of surplus power from the meter 23 of the home 20 of the user U1, instead.

The power ID is not only a value indicating the amount of power but also information associated with power identified by a place from which the power is supplied, a period in which the power is supplied, the amount of power, and the like. More specifically, the power ID generated as above may be information associated with the amount of power supplied from the home 20 of the user U1 in the certain period, the information being identified by the meter 23. The power ID corresponds to first identification information. A method for identifying surplus power will be described in detail later.

The power management apparatus 41 performs a process for charging the user U1 the price of power consumed by the user U1. More specifically, the power management apparatus 41 performs a process for charging the user U1 the price of power consumed in the home 20 of the user U1. As a rule, if the power supply apparatus 10 has supplied power to the load apparatus 32 of the user U1, the power management apparatus 41 performs a process for charging the user U1 the price of the supplied power. As an exception, however, if the power supply apparatus 10 has supplied power (first power) after holding a power ID, the power management apparatus 41 does not perform a process for charging the user U1 the price of the supplied power, that is, prohibits the charging process. In the power supplied to the load apparatus 32 from the power supply apparatus 10, the first power is power that does not cause a charging process. Power other than the first power is the second power. That is, if the power supply apparatus 10 has supplied power (second power) to the load apparatus 32 of the user U1 without holding a power ID, the power management apparatus 41 performs a process for charging the user U1 the price of the supplied power. The second power is power that causes a charging process.

The power management apparatus 41 (more specifically, a settlement process unit 427, which will be described later) performs a process for paying the user U1 money corresponding to the amount of surplus power supplied from the home 20 of the user U1. If the first power has been supplied to the load apparatus 32, the power management apparatus 41 performs a process for paying the user U1 money corresponding to the amount of power obtained by subtracting the amount of the first power from the amount of surplus power.

The transmission and distribution network 50 is connected to a power system of a power company or a part of the power system. The transmission and distribution network 50 is a network that distributes grid power. The transmission and distribution network 50 supplies power to the home 20 of the user U1 and the power supply apparatus 10.

The power supply apparatus 10 may further include a reception unit (not illustrated) that receives money corresponding to the amount of power supplied. If the power supply apparatus 10 has supplied power to the load apparatus 32 of the user U1 and the power management apparatus 41 does not perform a charging process, the reception unit receives, from the user U1, money corresponding to the amount of power supplied. As an exception, however, if the power supply apparatus 10 has supplied the first power, the reception unit does not receive, from the user U1, money corresponding to the amount of power supplied, that is, prohibits the reception of the money.

The reception unit is a slot into which bills and coins can be thrown, a combination of a card slot that reads information from a card having a settlement function and a communication unit, or a communication unit that reads information from the communication terminal 31 having a settlement function. The reception unit, however, is not limited to these examples.

In the power management system 1, power supply-demand balance is adjusted in each time period, which is a unit time in which the supply-demand balance is adjusted. The power supply apparatus 10 may supply the first power in the same time period in which the power generation apparatus 21 supplies surplus power to the transmission and distribution network 50. In doing so, the power management system 1 can supply power to the load apparatus 32 without disrupting the power supply-demand balance in the time period. As a result, it is possible to avoid increasing a power procurement cost.

Figure 3:
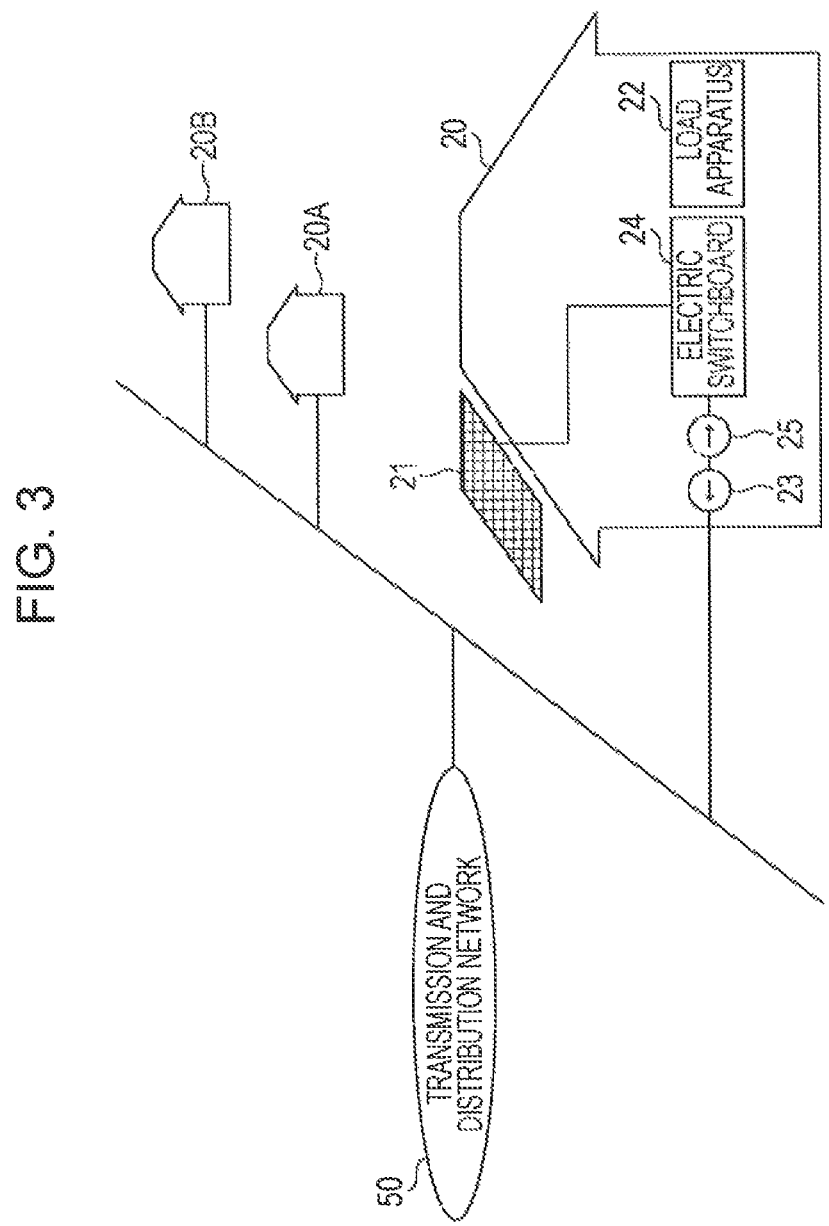
FIG. 3 is a schematic diagram specifically illustrating a part of the power management system according to the first embodiment including a user's home.

FIG. 3 is a schematic diagram specifically illustrating a part of the power management system 1 according to the present embodiment including the home 20 of the user U1.

As illustrated in FIG. 3, the home 20 of the user U1 is connected to the transmission and distribution network 50, and other houses 20A and 20B are also connected to the transmission and distribution network 50. The houses 20A and 20B may be houses having the same functions as the home 20 of the user U1, or may be conventional houses that do not include power generation equipment or the like.

As described above, the power generation apparatus 21, the load apparatus 22, and the meter 23 are installed in the home 20 of the user U1. An electric switchboard 24 and a meter 25 may also be installed in the home 20 of the user U1.

The electric switchboard 24 is connected to the transmission and distribution network 50, the power generation apparatus 21, and the load apparatus 22. If the amount of power generated by the power generation apparatus 21 exceeds the amount of power consumed by the load apparatus 22, the electric switchboard 24 supplies power to the transmission and distribution network 50. If the amount of power generated by the power generation apparatus 21 falls below the amount of power consumed by the load apparatus 22, the electric switchboard 24 receives power from the transmission and distribution network 50.

The meter 25 is a measuring device that is mounted on a power line and that measures the amount of power that flows therethrough. The meter 25 measures the amount of power (the so-called amount of power purchased) flowing from the transmission and distribution network 50 to the home 20 of the user U1 in each measurement period and transmits a value indicating the measured amount of power to the power management apparatus 41.

Next, the power management apparatus 41 will be described in detail.

Figure 4:
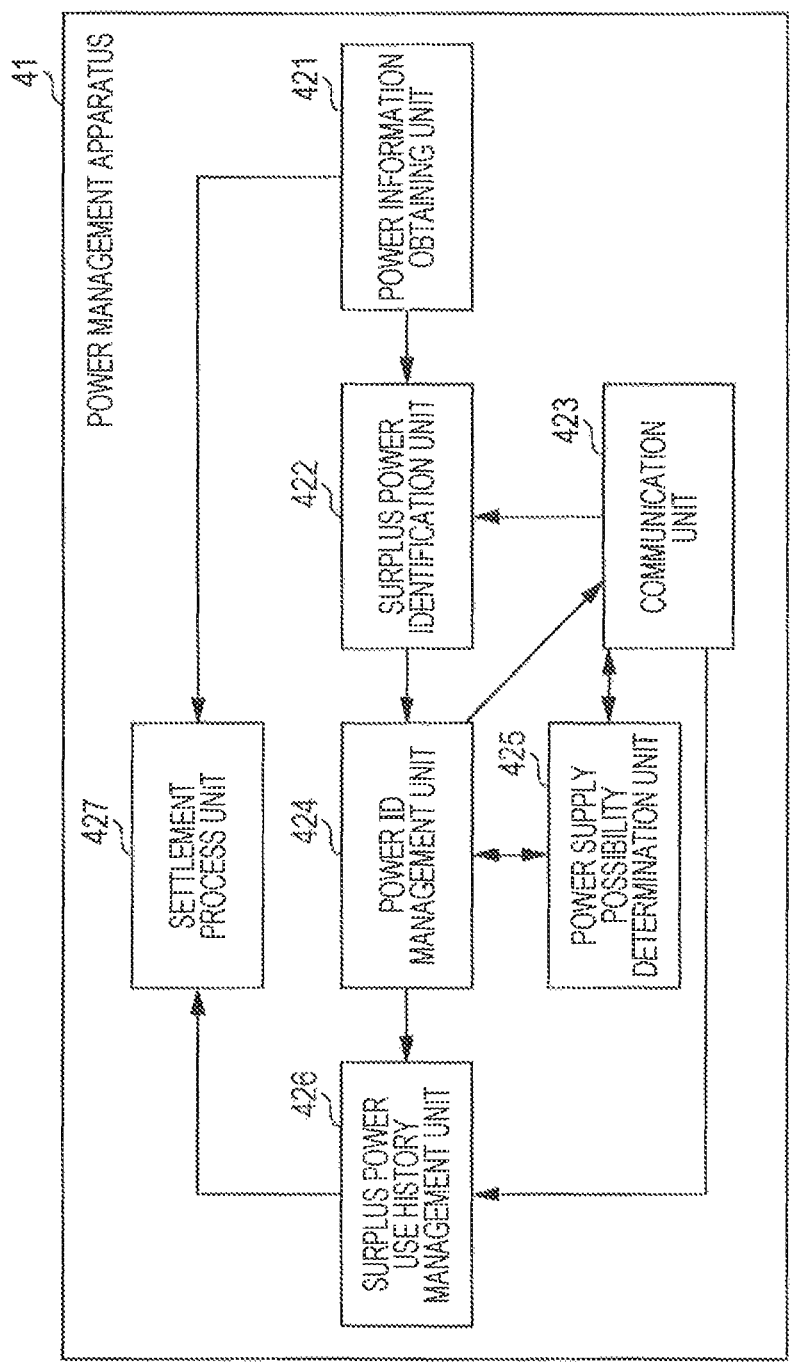
FIG. 4 is a block diagram illustrating specific function blocks of a power management apparatus according to the first embodiment.

FIG. 4 is a block diagram illustrating specific function blocks of the power management apparatus 41 according to the present embodiment.

As illustrated in FIG. 4, the power management apparatus 41 includes a power information obtaining unit 421, a surplus power identification unit 422, a communication unit 423, a power ID management unit 424, a power supply possibility determination unit 425, a surplus power use history management unit 426, and the settlement process unit 427.

The power information obtaining unit 421 is a processing unit that obtains the amount of power sold in each time period, that is, the amount of surplus power, from the meter 23. The power information obtaining unit 421 can also obtain the amount of power purchased in each time period from the meter 25. The power information obtaining unit 421 then associates the amount of power sold and the amount of power purchased with the power supply contract and stores the amount of power sold, the amount of power purchased, and the power supply contract in a power information management table. The power information obtaining unit 421 also associates the amount of surplus power with the power supply contract and stores the amount of surplus power and the power supply contract in a surplus power information table.

The surplus power identification unit 422 is a processing unit that receives an inquiry about the possibility of power supply from the communication terminal 31 and that identifies surplus power in a time period on the basis of the amount of surplus power in each measurement period obtained by the power information obtaining unit 421.

More specifically, the surplus power identification unit 422 receives an inquiry about the possibility of power supply from the communication terminal 31 through the communication unit 423. Upon receiving the inquiry about the possibility of power supply, the surplus power identification unit 422 identifies an accumulated value of the amount of surplus power in each measurement period obtained by the power information obtaining unit 421 as the amount of surplus power in the time period. Alternatively, the surplus power identification unit 422 may identify the amount of surplus power in the time period by adding an estimated value of the amount of surplus power that has not been obtained to the accumulated value of the amount of surplus power in each measurement period obtained by the power information obtaining unit 421.

The communication unit 423 is a communication interface for enabling the function blocks of the power management apparatus 41 to communicate with the communication terminal 31.

The power ID management unit 424 is a processing unit that issues a power ID and that associates the power ID with an accumulated value of the amount of surplus power identified by the surplus power identification unit 422. The power ID management unit 424 transmits the identified amount of surplus power to the communication terminal 31 through the communication unit 423. The power ID management unit 424 associates the amount of surplus power and the power ID with each other and stores the amount of surplus power and the power ID in a power ID management table. Each power ID may be provided with an expiration time. As the expiration time, an end time of a time period including a time at which each power ID has been issued is used. The power ID management unit 424 can then manage power IDs whose expiration times have not yet come as valid power IDs and power IDs whose expiration times have come as invalid power IDs. If a power ID indicated in a record is valid, the power ID can be used, that is, more specifically, the power supply apparatus 10 can supply power using the power ID. If a power ID indicated in a record is invalid, the power ID is not valid. In this case, the power ID cannot be used, that is, the power supply apparatus 10 cannot supply power using the power ID.

The power supply possibility determination unit 425 is a processing unit that determines whether the amount of power indicated in a power supply request received from the power supply apparatus 10 can be supplied.

The surplus power use history management unit 426 is a processing unit that receives a power supply report after the power supply apparatus 10 supplies power and that updates surplus power use information. The surplus power use history management unit 426 associates a power ID and the amount of power supplied using the power ID with each other and stores the power ID and the amount of power in a surplus power use information table. The surplus power use history management unit 426 associates a contract ID and the amount of power supplied from the power supply apparatus 10 using the contract ID with each other and stores the contract ID and the amount of power in a power supply apparatus use information table.

The settlement process unit 427 is a processing unit that performs a process for settling an electricity bill on the basis of the amount of power purchased and the amount of power sold in the home 20 of the user U1. The settlement process unit 427 performs the process for settling an electricity bill in consideration of power supplied from the power supply apparatus 10.

FIG. 5 is a diagram illustrating a surplus power information table T10 according to the present embodiment.

The surplus power information table T10 is a table held by the power information obtaining unit 421. In the surplus power information table T10, the amount of surplus power in each measurement period obtained by the power information obtaining unit 421 from the meter 23 is stored as a record. Items of the surplus power information table T10 will be described hereinafter.

"Contract ID" is an ID for uniquely identifying a power supply contract in which the amount of surplus power indicated in a corresponding record has been caused.

"Meter ID" is an ID for uniquely identifying the meter 23 that has measured the amount of surplus power indicated in the corresponding record.

"Measurement period start time" is a start time of a measurement period in which the amount of surplus power indicated in the corresponding record has been caused.

"Measurement period end time" is an end time of the measurement period in which the amount of surplus power indicated in the corresponding record has been caused.

"Amount of surplus power" is the amount of surplus power indicated in the corresponding record and expressed, for example, in Wh.

A first record in the surplus power information table T10 illustrated in FIG. 5, for example, indicates that, in a power supply contract whose contract ID is "00001", a meter 23 whose meter ID is "123456789" has measured a surplus power of 340 Wh in a measurement period "04/01/2015 10:30:00 to 10:35:00".

FIG. 6 is a diagram illustrating a power ID management table T20 according to the present embodiment.

The power ID management table T20 is a table held by the power ID management unit 424. In the power ID management table T20, a power ID issued by the power ID management unit 424 and associated with the amount of surplus power is stored as a record. Items of the power ID management table T20 will be described hereinafter.

"Power ID" is a power ID indicated in a corresponding record.

"Expiration time" is an expiration time of the power ID indicated in the corresponding record, that is, at time at which the power ID expires.

"Amount of surplus power" is the amount of surplus power associated with the power ID indicated in the corresponding record, that is, the amount of surplus power associated when the power ID has been issued.

"Amount of power available" is the amount of power available in the amount of surplus power associated with the power ID indicated in the corresponding record. The amount of power available is the same as the amount of surplus power immediately after the power ID issued, but decreases as the surplus power is consumed.

"Record registration time" is a time at which the corresponding record has been registered.

A first record in the power ID management table T20 illustrated in FIG. 6, for example, indicates that a power ID "1504011040766" is associated with a surplus power of 766 Wh and a power of 766 Wh is available. The expiration time of the power ID is "04/01/2015 11:00:00", and the time at which the record has been registered is "04/01/2015 10:40:00".

FIG. 7 is a diagram illustrating a surplus power use information table T30 according to the present embodiment.

The surplus power use information table T30 is a table held by the surplus power use history management unit 426. In the surplus power use information table T30, the amount of power used by the power supply apparatus 10 for supplying power is stored as a record.

"Power ID" is a power ID associated with the amount of power used for power supply indicated in a corresponding record.

"Power supply start time" is a time at which the power supply apparatus 10 indicated in the corresponding record has started supplying power.

"Power supply end time" is a time at which the power supply apparatus 10 indicated in the corresponding record has stopped supplying power.

"Amount of power supplied" is the amount of power supplied by the power supply apparatus 10 indicated in the corresponding record.

"Power supply apparatus ID" is an ID for uniquely identifying the power supply apparatus 10 indicated in the corresponding record that has supplied power.

"Record registration time" is a time at which the corresponding record has been registered.

A record in the surplus power use information table T30 illustrated in FIG. 7 indicates that a power of 500 Wh associated with the power ID of "1504011040766" has been supplied by a power supply apparatus 10 whose power supply apparatus ID is "abcde98765" in "04/01/2015 10:45:00 to 10:50:00". The record has been registered at "04/01/2015 10:50:00".

FIG. 8 is a diagram illustrating a power information management table T40 according to the present embodiment.

The power information management table T40 is a table held by the power information obtaining unit 421. In the power information management table T40, the amount of power purchased and the amount of power sold in the home 20 of the user U1 in each time period are stored as a record.

"Contract ID" is an ID for uniquely identifying a power supply contract in which the amount of power purchased and the amount of power sold indicated in a corresponding record have been measured.

"Meter ID" is an ID for uniquely identifying the meters (the meter 23 and the meter 25) that have measured the amount of power purchased and the amount of power sold indicated in the corresponding record.

"Time period start time" is a start time of a time period in which the amount of power purchased and the amount of power sold indicated in the corresponding record have been measured.

"Time period end time" is an end time of a time period in which the amount of power purchased and the amount of power sold indicated in the corresponding record have been measured.

"Amount of power purchased" is a value indicating the amount of power purchased indicated in the corresponding record and expressed, for example, in Wh.

"Amount of power sold" is a value indicating the amount of power sold indicated in the corresponding record and expressed, for example, in Wh.

A first record in the power information management table T40 illustrated in FIG. 8, for example, indicates that, in the power supply contract whose contract ID is "00001", the meter 23 whose meter ID is "123456789" has measured a purchased power of 0 Wh and a sold power of 1,000 Wh in a time period "04/01/2015 10:00:00 to 10:30:00".

FIG. 9 is a diagram illustrating a power supply apparatus use information table T50 according to the present embodiment.

The power supply apparatus use information table T50 is a table held by the surplus power use history management unit 426. In the power supply apparatus use information table T50, the amount of surplus power and the amount of grid power in the amount of power supplied by the power supply apparatus 10 are stored as a record.

"Contract ID" is an ID for uniquely identifying a power supply contract relating to the amount of surplus power supplied and the amount of grid power supplied indicated in a corresponding record.

"Power supply apparatus ID" is an ID for uniquely identifying the power supply apparatus 10 that has performed power supply relating to the corresponding record.

"Power supply period start time" is a start time of a period in which the power supply relating to the corresponding record has been performed.

"Power supply period end time" is an end time of the period in which the power supply relating to the corresponding record has been performed.

"Amount of power supplied" is a value indicating the amount of power supplied relating to the record and expressed, for example, in Wh.

"Amount of surplus power supplied" is a value indicating the amount of surplus power in the amount of power supplied relating to the corresponding record and expressed, in Wh.

"Amount of grid power supplied" is a value indicating the amount of grid power in the amount of power supplied relating to the corresponding record and expressed, in Wh.

A first record in the power supply apparatus use information table T50 illustrated in FIG. 9, for example, indicates that, in the power supply contract whose contract ID is "00001", the power supply apparatus 10 whose power supply apparatus ID is "abcde98765" supplies a power of 500 Wh. In this power, the amount of surplus power supplied is 500 Wh, and the amount of grid power supplied is 0 Wh.

Next, the method for identifying surplus power, a method for inquiring about the possibility of power supply, and a method for responding to an inquiry will be described.

FIG. 10 is a diagram illustrating surplus power according to the present embodiment. FIG. 10 is a diagram illustrating the method for identifying surplus power used by the power management apparatus 41.

FIG. 10 illustrates changes in the amount of surplus power, which is the amount of power generated by the power generation apparatus 21 and supplied to the transmission and distribution network 50, over time. A "time period" illustrated in FIG. 10 refers to a unit time in which the retailer 40 needs to achieve balancing between supply and demand of power. That is, the retailer 40 controls power supply-demand balance such that supply and demand match in the time period. A time period x illustrated in FIG. 10 is a period from a time T(x) to a time T(x+1).

The power management apparatus 41 obtains the amount of surplus power 301 illustrated in FIG. 10 by obtaining the amount of power measured by the meter 23, that is, the amount of power flowing from the home 20 of the user U1 to the transmission and distribution network 50. FIG. 10 illustrates a case in which, when the power management apparatus 41 obtains the amount of power from the meter 23, the meter 23 has obtained and held the amount of power before a time T(x)+t.

The power management apparatus 41 sums the amount of surplus power 301 obtained from the meter 23 to identify the amount of surplus power EP1 in the time period x.

The power management apparatus 41 may identify the expected amount of surplus power 302 in a part of the time period x after the time T(x)+t as well as the amount of surplus power 301 obtained from the meter 23. In this case, the power management apparatus 41 may identify the amount of surplus power EP2 in the time period x by summing the amount of surplus power 301 and the amount of surplus power 302. In doing so, the amount of surplus power caused in the time period x can be used more efficiently in the power management system 1.

FIG. 11 is a diagram illustrating an inquiry about the possibility of power supply and a response to the inquiry according to the present embodiment. FIG. 11 illustrates the amount of surplus power identified by the surplus power identification unit 422 after an inquiry about the possibility of power supply is made in a time period y.

If the communication terminal 31 inquires of the power management apparatus 41 about the possibility of power supply at 10:17, the surplus power identification unit 422 identifies the amount of surplus power as 800 Wh by accumulating the amount of power (340 Wh, 426 Wh, and 34 Wh) in measurement periods from 10:30 to 10:45 that have already been obtained by the power information obtaining unit 421. The surplus power identification unit 422 then transmits a value indicating the amount of surplus power to the communication terminal 31 as a response.

When identifying surplus power, the surplus power identification unit 422 may estimate the amount of surplus power in measurement periods in the time period y from which the amount of surplus power has not yet been obtained and add an accumulated value of the estimated amount of surplus power to the aforementioned amount of surplus power. More specifically, the surplus power identification unit 422 may identify the amount of surplus power in the time period y as 1,600 Wh, for example, by estimating that the amount of surplus power in measurement periods from 10:45 to 11:00 is the same as that in the time periods from 10:30 to 10:45.

Next, a process performed by the power management system 1 will be described.

Figure 12:
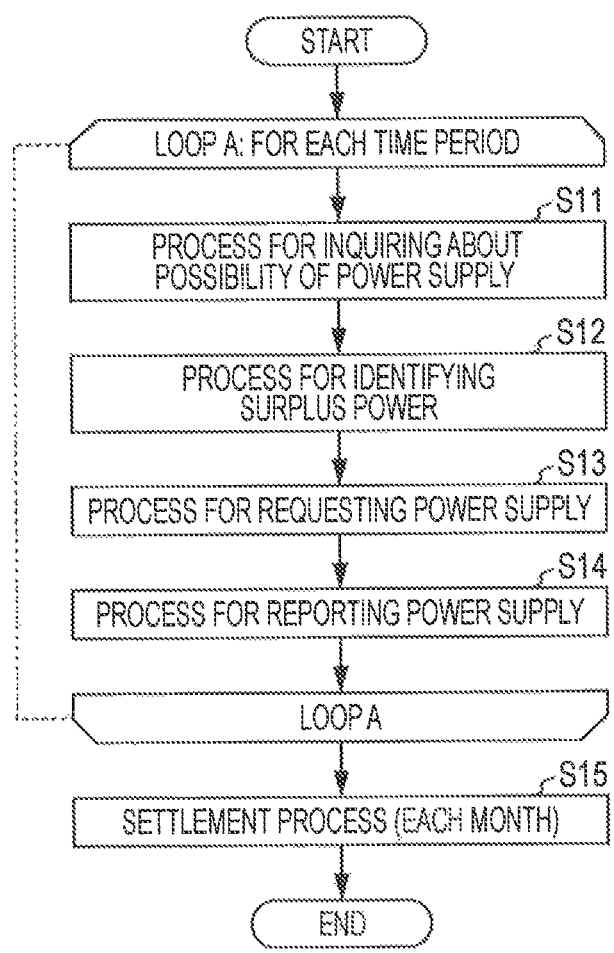
FIG. 12 is a flowchart illustrating an overall process performed by the power management system according to the first embodiment.

FIG. 12 is a flowchart illustrating an overall process performed by the power management system 1 according to the present embodiment.

The power management system 1 performs processing in steps S11 to S14 for each time period (loop A).

In steps S11 to S14, the power management system 1 performs the process for inquiring about the possibility of power supply, the process for identifying surplus power, the process for requesting power supply, and the process for reporting power supply.

The power management system 1 also performs a settlement process in a cycle independent of the above processes performed in each time period (step S15). The cycle may have any length insofar as the cycle is longer than each time period. The length of the cycle may be, for example, a month.

Details of processing in the above steps will be described hereinafter.

Figure 13:
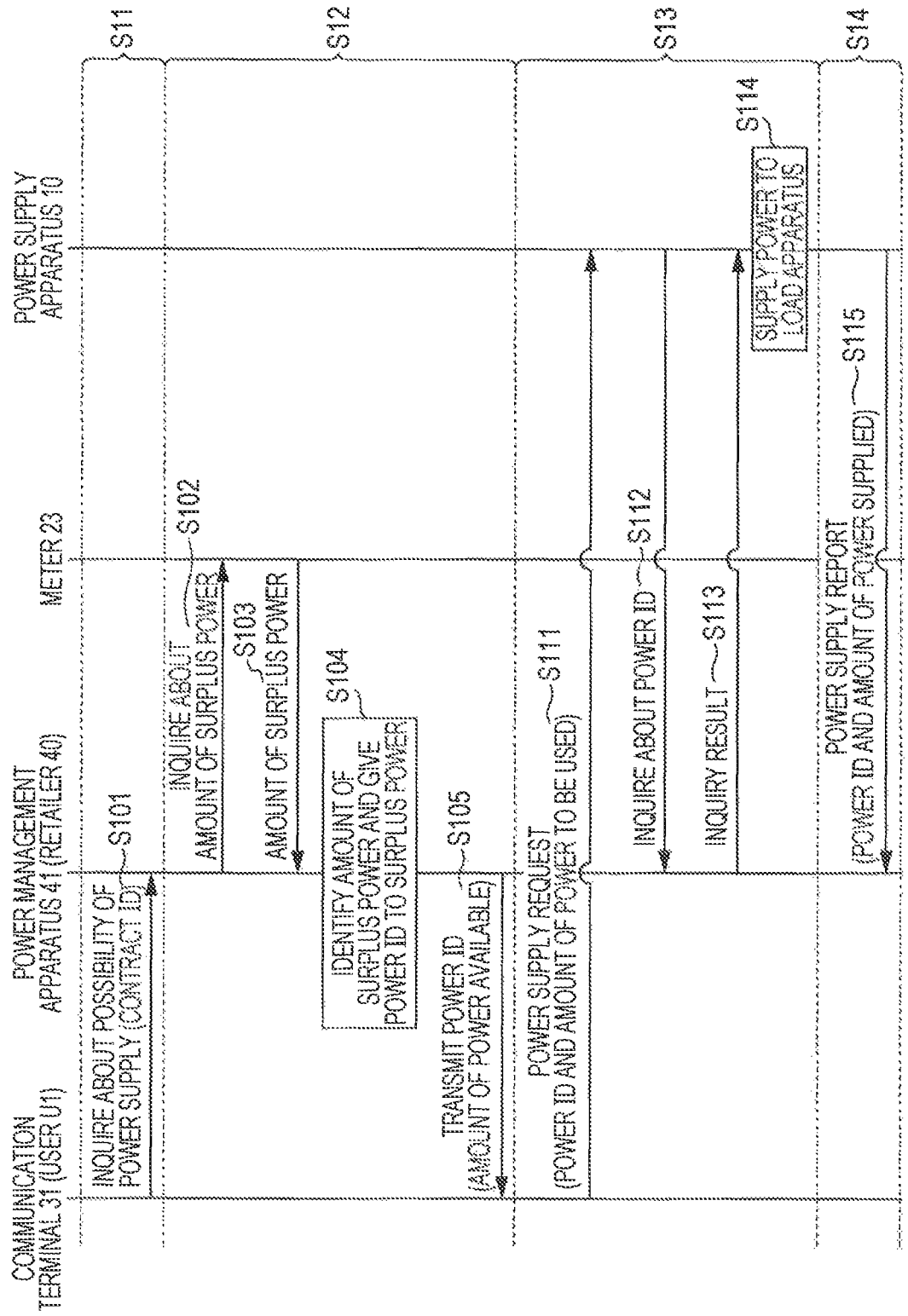
FIG. 13 is a sequence diagram illustrating transmission of information in the power management system according to the first embodiment from a process for inquiring about the possibility of power supply to a process for reporting power supply.

FIG. 13 is a sequence diagram illustrating transmission of information in the power management system 1 according to the present embodiment from the inquiry about the possibility of power supply to the power supply report. The process performed by the power management system 1 will be described in more detail with reference to FIG. 13.

Steps illustrated in FIG. 13 are included in the processing steps illustrated in FIG. 12. Step S101 illustrated in FIG. 13, for example, is processing included in step S11 illustrated in FIG. 12, and steps S102 to S105 illustrated in FIG. 13 are processing included in step S12 illustrated in FIG. 12. Steps S111 to S114 illustrated in FIG. 13 are processing included in step S13 illustrated in FIG. 12, and step S115 illustrated in FIG. 13 is processing included in step S14 illustrated in FIG. 12. This, however, is an example, and relationships between steps are not limited to this.

In step S101, the communication terminal 31 of the user U1 transmits an inquiry about the possibility of power supply to the power management apparatus 41. The power management apparatus 41 receives the inquiry about the possibility of power supply. The inquiry about the possibility of power supply is used for inquiring of the power management apparatus 41 whether the power supply apparatus 10 in the power management system 1 can supply power, that is, whether the home 20 of the user U1 causes surplus power. When inquiring about the possibility of power supply, the communication terminal 31 transmits a contract ID, which is an ID for uniquely identifying a contract between the user U1 and the retailer 40. Alternatively, the communication terminal 31 may transmit a user ID, which is an ID for uniquely identifying the user U1, instead of the contract ID, while associating the user ID with the inquiry about the possibility of power supply. The user ID of the user U1 will also be referred to as "first user identification information".

The communication terminal 31 transmits the inquiry about the possibility of power supply to the power management apparatus 41 using a communication path through a communication line. Alternatively, the inquiry about the possibility of power supply may be automatically transmitted, for example, after a certain application is activated on a smartphone, which is the communication terminal 31, or after the user U1 performs a certain operation.

In step S102, the power management apparatus 41 transmits an inquiry about the amount of surplus power to the meter 23 of the home 20 of the user U1. The power management apparatus 41 requests the meter 23 to output a value indicating the amount of surplus power corresponding to a time period including a reception time, which is a time at which the inquiry about the possibility of power supply in step S101 has been received (input). More specifically, the power management apparatus 41 identifies the user U1 by referring to the contract ID included in the inquiry about the possibility of power supply in step S101. The power management apparatus 41 then transmits the inquiry about the amount of surplus power to request the meter 23 of the home 20 of the identified user U1 to transmit the value indicating the amount of surplus power measured by the meter 23 thereto. Alternatively, the power management apparatus 41 may include information for identifying a period of the amount of surplus power to be obtained in the inquiry about the amount of surplus power and transmit the inquiry.

In step S103, the meter 23 transmits the value indicating the amount of surplus power to the power management apparatus 41 in accordance with the inquiry about the amount of surplus power received from the power management apparatus 41 in step 3102. The power management apparatus 41 receives the amount of surplus power transmitted from the meter 23. The meter 23 may transmit individual values (340 Wh, 426 Wh, and 34 Wh in the example illustrated in FIG. 11) indicating the amount of surplus power in measurement periods in the time period including a current time or may transmit an accumulated value (800 Wh in the example illustrated in FIG. 11) of the amount of surplus power in the measurement periods in the time period including the current time. In the following description, the former will be taken as an example. If a period is specified in step S102, the meter 23 transmits a value indicating the amount of surplus power in the period identified by the information to the power management apparatus 41. The power management apparatus 41 stores the received values indicating the amount of surplus power in the surplus power information table T10.

In step S104, the power management apparatus 41 identifies surplus power on the basis of the amount of surplus power obtained in step S103. The power management apparatus 41 issues a power ID, which is an ID for uniquely identifying the surplus power, and gives the power ID to the identified surplus power. In other words, the power management apparatus 41 identifies the surplus power on the basis of the amount of surplus power obtained in step S103 and issues the power ID, which is the ID for uniquely identifying the surplus power, while associating the power ID with the surplus power. More specifically, the power management apparatus 41 identifies the surplus power by calculating an accumulated value of the amount of surplus power in the measurement periods obtained in step S103. The identification of the surplus power and the provision of the power ID in this step are performed in accordance with the inquiry about the possibility of power supply in step S101. The power ID is information for validating power supply performed by the power supply apparatus 10 using the surplus power corresponding to the time period including the current time.

In step S105, the power management apparatus 41 transmits, to the communication terminal 31, the power ID given in step S104. When transmitting the power ID, the power management apparatus 41 notifies the communication terminal 31 of the amount of power available. The amount of power available is the same as the amount of surplus power identified in step S104 and indicates the amount of power that can be supplied from the power supply apparatus 10 using the power ID. Instead of transmitting the power ID to the communication terminal 31, the power management apparatus 41 may let the user U1 obtain the power ID in a manner that a person can understand the power ID. The user U1 may, for example, obtain a paper medium on which the power ID is written, or the user U1 may hear the power ID as a speech sound.

In step 3105, the power management apparatus 41 may determine whether or not the accumulated value of the amount of surplus power corresponding to the time period is equal to or smaller than a certain minimum value. If the accumulated value of the amount of surplus power corresponding to the time period is equal to or smaller than the certain minimum value, the power management apparatus 41 may perform control such that the power ID is not issued or associated with the accumulated value of the amount of surplus power corresponding to the time period. In this case, the power management apparatus 41 may perform control such that the power ID and the accumulated value are not transmitted to the communication terminal 31 in accordance with the inquiry of the possibility of power supply. In addition, in this case, the power management apparatus 41 may perform control in such a way as to notify the communication terminal 31 that the accumulated value of the amount of surplus power corresponding to the time period is equal to or smaller than the certain minimum value in accordance with the inquiry of the possibility of power supply. In doing so, if the amount of power that can be supplied from the power supply apparatus 10 is equal to or smaller than the certain minimum value, the power management apparatus 41 can prohibit the power supply apparatus 10 from supplying power or notify the user U1 of the prohibition.

In step S111, the communication terminal 31 sends a power supply request to the power supply apparatus 10. The power supply request is information indicating that the user U1 desires to receive power with the load apparatus 32. The power supply request includes the power ID transmitted from the power management apparatus 41 in step S105 and the amount of power to be used, which is the amount of power that the user U1 desires to receive. The power supply apparatus 10 receives the power supply request and the power ID included in the power supply request. Although the communication terminal 31 inputs the power supply request to the power supply apparatus 10 in the above description, another apparatus may input the power supply request to the power supply apparatus 10, instead. The amount of power to be used may be a value equal to or smaller than the amount of power available associated with the power ID, or may be a sign indicating the amount of power available.

The power supply request is transmitted, for example, by bringing the communication terminal 31 close to the near field communication port that is the input interface 11 of the power supply apparatus 10 and performing near field communication. Alternatively, the power supply request may be transmitted through a communication line. Alternatively, the user U1 may manually input the power ID using the keys that are the input interface 11 in order to transmit the power supply request.

In step S112, the power supply apparatus 10 inquires of the power management apparatus 41 about the power ID obtained as a result of the power supply request transmitted in step S111. More specifically, the power supply apparatus 10 inquires of the power management apparatus 41 whether the power ID is a legitimate, valid power ID that has been issued by the power management apparatus 41. If the power ID has been forged or is a copy of a power ID that has already been used in the past, for example, it can be determined that the power ID is not legitimate or, if the power ID corresponds to the amount of surplus power in a past time period, not valid.

In the inquiry in step S112, the power supply apparatus 10 may also inquires of the power management apparatus 41 about the amount of power to be used transmitted from the communication terminal 31 in step 6105. If the amount of power to be used exceeds the amount of power available corresponding to the power ID, it can be determined that the amount of power to be used is not reasonable.

In step S113, the power management apparatus 41 transmits, to the power supply apparatus 10, a result of the inquiry about the power ID transmitted in step S112. More specifically, if the power ID transmitted in step S112 is legitimate, the power management apparatus 41 transmits a response indicating that the power ID is legitimate.

In step 6114, the power supply apparatus 10 supplies the amount of power to be used received along with the power ID in the power supply request to the load apparatus 32 connected thereto. At this time, the power supply apparatus 10 does not receive money corresponding to the amount of power supplied, that is, prohibits the reception of money. In other words, the power supply apparatus 10 supplies power that does not cause a charging process to the load apparatus 32. If, as described above, the power supply apparatus 10 has supplied power to the load apparatus 32 on the basis of a single power ID, the power supply apparatus 10 may be prevented from supplying power to the load apparatus 32 again on the basis of the power ID. If the amount of power to be used is smaller than the amount of power available, the power supply apparatus 10 may supply power again in the same time period on the basis of the power ID insofar as the sum of the amount of power supplied using the power ID is equal to or smaller than the amount of power available.

In step S115, if the power supply apparatus 10 has supplied power to the load apparatus 32 in step S114, the power supply apparatus 10 transmits a power supply report to the power management apparatus 41. The power supply report includes the power ID and the amount of power supplied.

Although the meter 23 transmits a value indicating the amount of surplus power in accordance with the inquiry about the amount of surplus power in the above description, the meter 23 may periodically transmit a value indicating the amount of surplus power, instead. That is, the processing in steps S101 to S105 illustrated in FIG. 13 may be replaced by processing illustrated in FIG. 14.

Figure 14:
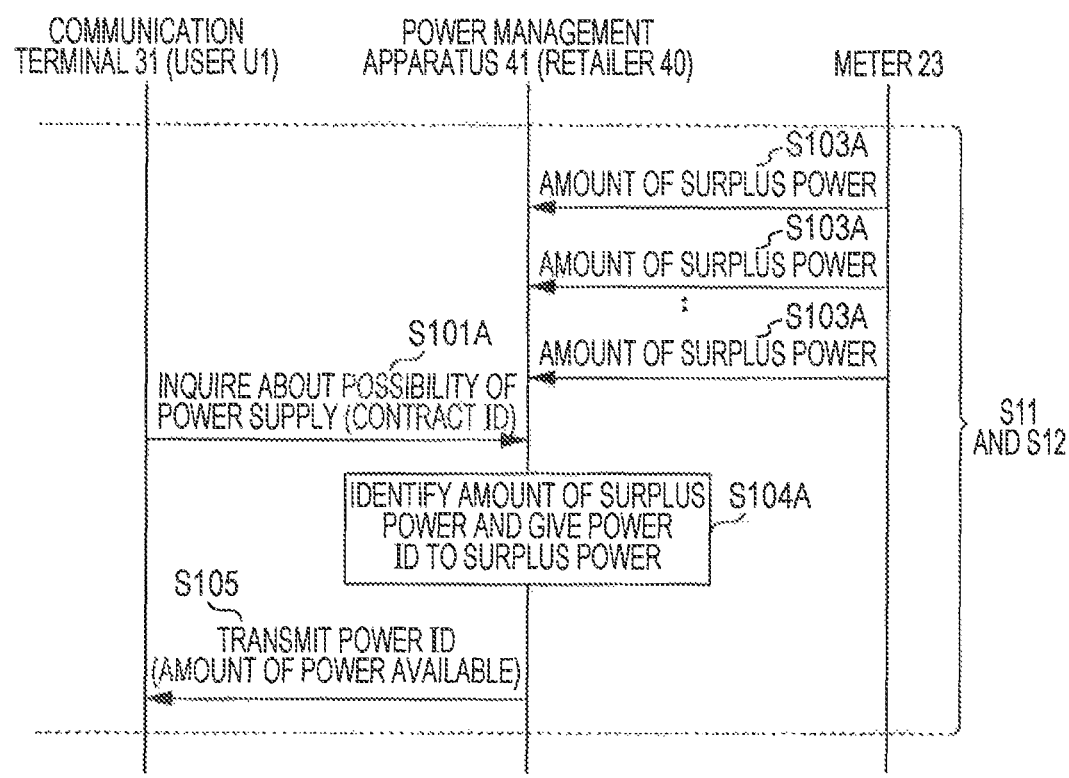
FIG. 14 is a sequence diagram illustrating transmission of information in the power management system according to a modification of the first embodiment from the process for inquiring about the possibility of power supply to the process for reporting power supply.

FIG. 14 is a sequence diagram illustrating transmission of information in the power management system 1 according to a modification of the present embodiment from the process for inquiring about the possibility of power supply to the process for reporting power supply.

In step S103A, the meter 23 periodically transmits a value indicating the amount of surplus power to the power management apparatus 41 in each measurement period. The power management apparatus 41 periodically receives the value indicating the amount of surplus power. The power management apparatus 41 stores the received value indicating the amount of surplus power in the surplus power information table T10. Step S103A is different from step 3103 in that the meter 23 automatically transmits the value indicating the amount of surplus power in step S103A.

In step S101A, the communication terminal 31 of the user U1 transmits an inquiry about the possibility of power supply to the power management apparatus 41.

In step S104A, the power management apparatus 41 identifies surplus power on the basis of the amount of surplus power obtained in step 3103A. The power management apparatus 41 then issues a power ID, which is an ID for uniquely identifying the surplus power, and gives the power ID to the identified amount of surplus power. More specifically, if the power management apparatus 41 receives the inquiry about the possibility of power supply in step 3101A, the power management apparatus 41 accumulates values of the amount of surplus power corresponding to a period from a start time of a time period including a reception time, which is a time at which the inquiry about the possibility of power supply has been received, to the reception time. The power management apparatus 41 then generates an accumulated value of the amount of surplus power corresponding to the time period to identify the surplus power.

Step S105 is the same as step S105 illustrated in FIG. 13.

Figure 15:
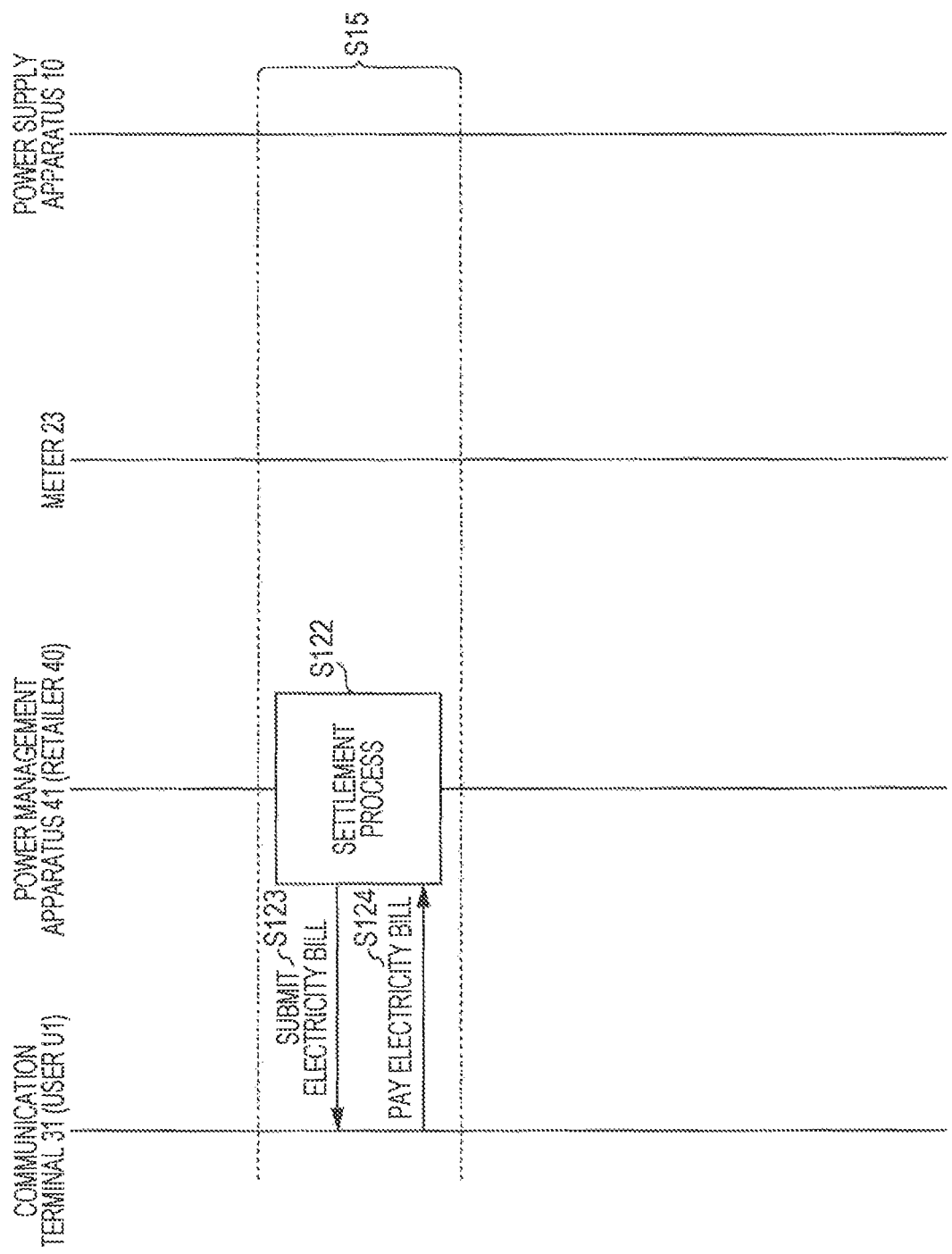
FIG. 15 is a sequence diagram illustrating transmission of information in the power management system according to the first embodiment during a charging process.

FIG. 15 is a sequence diagram illustrating transmission of information in the power management system 1 according to the present embodiment during the charging process. The process performed by the power management system 1 will be described in more details with reference to FIG. 15.

Steps illustrated in FIG. 15 are included in the processing steps illustrated in FIG. 12. Steps S122 to S124 illustrated in FIG. 15, for example, are included in step 315 illustrated in FIG. 12. This, however, is an example, and relationships between steps are not limited to this.

In step S122, the power management apparatus 41 performs the settlement process. In the settlement process, a price obtained by subtracting money (a price) corresponding to the amount of surplus power supplied from the home 20 of the user U1 from a price corresponding to the amount of power supplied to the load apparatus 22 from the transmission and distribution network 50 and consumed is calculated as a bill to be sent to the user U1 on the basis of the power supply contract between the retailer 40 and the user U1. At this time, the price is calculated while subtracting the amount of power supplied from the power supply apparatus 10 in step S114 from the amount of surplus power supplied from the home 20 of the user U1.

In step S123, the retailer 40 sends the bill (electricity bill) calculated in the settlement process in step S122 to the user U1.

In step 3124, the user U1 pays the electricity bill sent thereto in step 3123.

Steps S112 and S113 need not necessarily be performed if it is clear that the power supply apparatus 10 holds a legitimate power ID.

The charging process in step S122 and the sending of a bill in step 3123 are performed in each period specified in the power supply contract between the retailer 40 and the user U1. The charging process is performed, for example, each month.

Details of processes performed by the function blocks of the power management apparatus 41 will be described hereinafter.

In step S11 illustrated in FIG. 12, the communication terminal 31 only inquires of the power management apparatus 41 about the possibility of power supply, and description of details of this processing is omitted.

Figure 16:
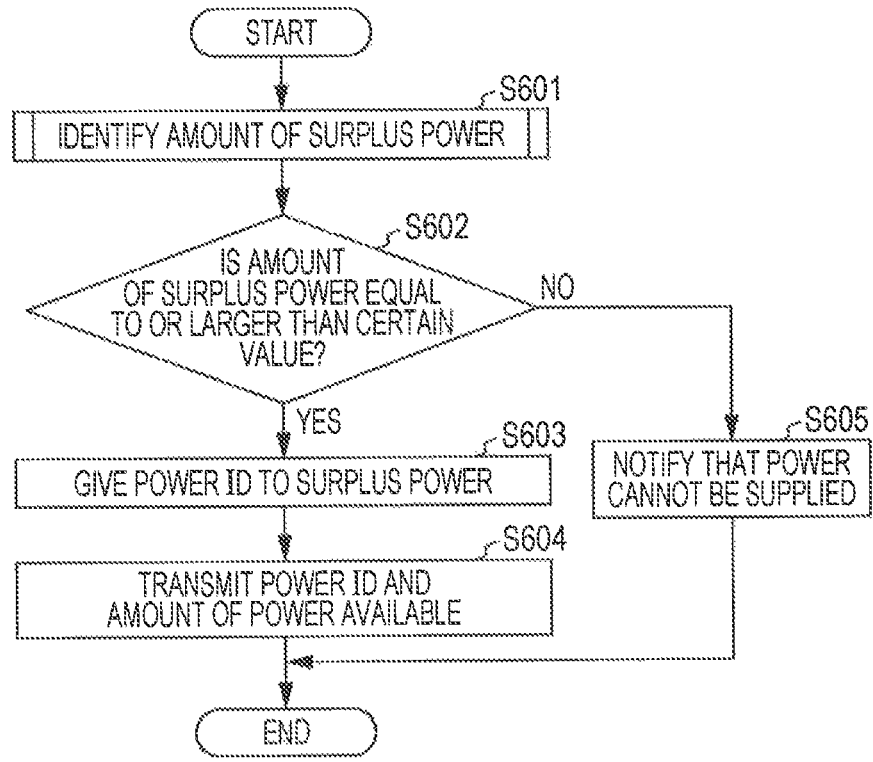
FIG. 16 is a flowchart illustrating a process performed by the power management apparatus according to the first embodiment.

FIG. 16 is a flowchart illustrating the process performed by the power management apparatus 41 according to the present embodiment. The flowchart of FIG. 16 illustrates the process performed by the power management apparatus 41 in step S12 illustrated in FIG. 12.

In step S601, the surplus power identification unit 422 identifies the amount of surplus power. Step S601 corresponds to step S104 (FIG. 13) or step 3104A (FIG. 14). The processing in step S601 will be described in detail later.

In step S602, the surplus power identification unit 422 determines whether or not the amount of surplus power identified in step 3601 is equal to or larger than a certain value. If the surplus power identification unit 422 determines that the amount of surplus power is equal to or larger than the certain value, the process proceeds to step S603. On the other hand, if the surplus power identification unit 422 determines that the amount of surplus power is not equal to or larger than the certain value (that is, smaller than the certain value), the process proceeds to step S605.

In step S603, the power ID management unit 424 gives a power ID to surplus power corresponding to the amount of surplus power identified in step S601. Step S603 corresponds to step S104 (FIG. 13) or step S104A (FIG. 14).

In step 3604, the power ID management unit 424 transmits, to the communication terminal 31, the power ID given in step S603. The power ID management unit 424 also transmits a value indicating the amount of surplus power identified in step S601 to the communication terminal 31 as the amount of power available. The amount of power available is a value indicating the amount of power available at a time when the power supply apparatus 10 supplies the surplus power.

In step S605, the surplus power identification unit 422 notifies the communication terminal 31 that power cannot be supplied (power supply is impossible).

As a result of the above process, the power management apparatus 41 appropriately transmits the power ID in response to the inquiry about the possibility of power supply from the communication terminal 31.

Figure 17:
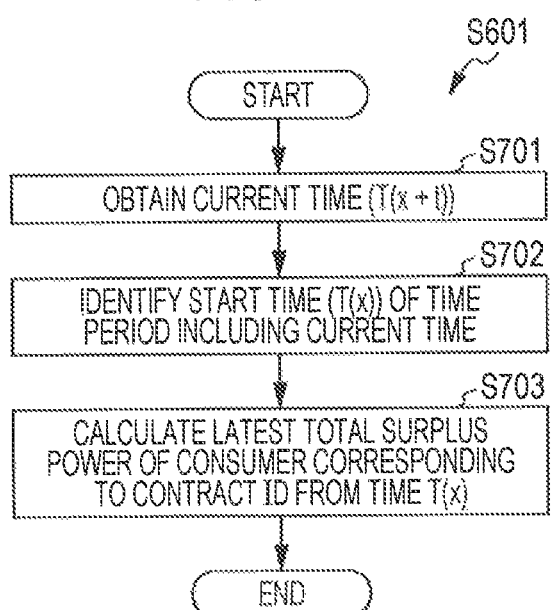
FIG. 17 is a first flowchart illustrating a process for identifying surplus power performed by a surplus power identification unit according to the first embodiment.

FIG. 17 is a first flowchart illustrating the process for identifying surplus power performed by the surplus power identification unit 422 according to the present embodiment. This flowchart illustrates details of the processing in step S601 illustrated in FIG. 16 and is true in a case in which the meter 23 periodically transmits the value indicating the amount of surplus power to the power management apparatus 41 as illustrated in FIG. 14.

In step S701, the surplus power identification unit 422 obtains the current time. A time period including the current time will be referred to as the "time period x", and the start time of the time period x will be denoted by T(x). In this case, the current time is expressed as T(x)+t. Here, t corresponds to time elapsed since T(x) until the current time.

In step S702, the start time T(x) of the time period including the current time is identified on the basis of the current time T(x)+t obtained in step S701.

In step S703, the surplus power identification unit 422 calculates, in the surplus power stored in the surplus power information table T10, the total amount of surplus power, that is, an accumulated value of the amount of surplus power, of a consumer corresponding to the contract ID from the time T(x) to a time up to which the amount of surplus power has already been obtained in the time period x.

As a result of the above process, the power management apparatus 41 can identify the surplus power.

Figure 18:
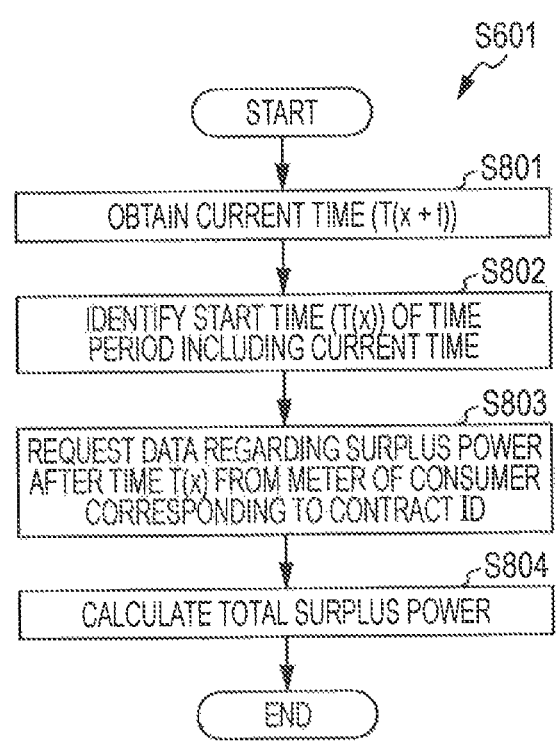
FIG. 18 is a second flowchart illustrating the process for identifying surplus power performed by the power management apparatus according to the first embodiment.

The process illustrated in FIG. 17 may be replaced by a process illustrated in FIG. 18.

FIG. 18 is a second flowchart illustrating the process for identifying surplus power performed by the power management apparatus 41 according to the present embodiment. This flowchart illustrates details of the processing in step S601 illustrated in FIG. 16 and is true in a case in which the meter 23 transmits the amount of surplus power to the meter 23 in accordance with an inquiry about the amount of surplus power as illustrated in FIG. 13.

Steps S801 and S802 are the same as steps S701 and S702, respectively, illustrated in FIG. 17.

In step S803, the surplus power identification unit 422 requests the meter 23 of the consumer corresponding to the contract ID to transmit data regarding the amount of surplus power after the start time T(x) of the time period including the current time. The surplus power identification unit 422 then obtains the data regarding the amount of surplus power in each measurement period after the time T(x).

In step S804, the surplus power identification unit 422 stores the obtained data regarding the amount of surplus power in the surplus power information table T10. The surplus power identification unit 422 then calculates, in the amount of surplus power stored in the surplus power information table T10, the total amount of surplus power, that is, an accumulated value of the amount of surplus power, of the consumer corresponding to the contract ID from the time T(x) to the current time.

Figure 19:
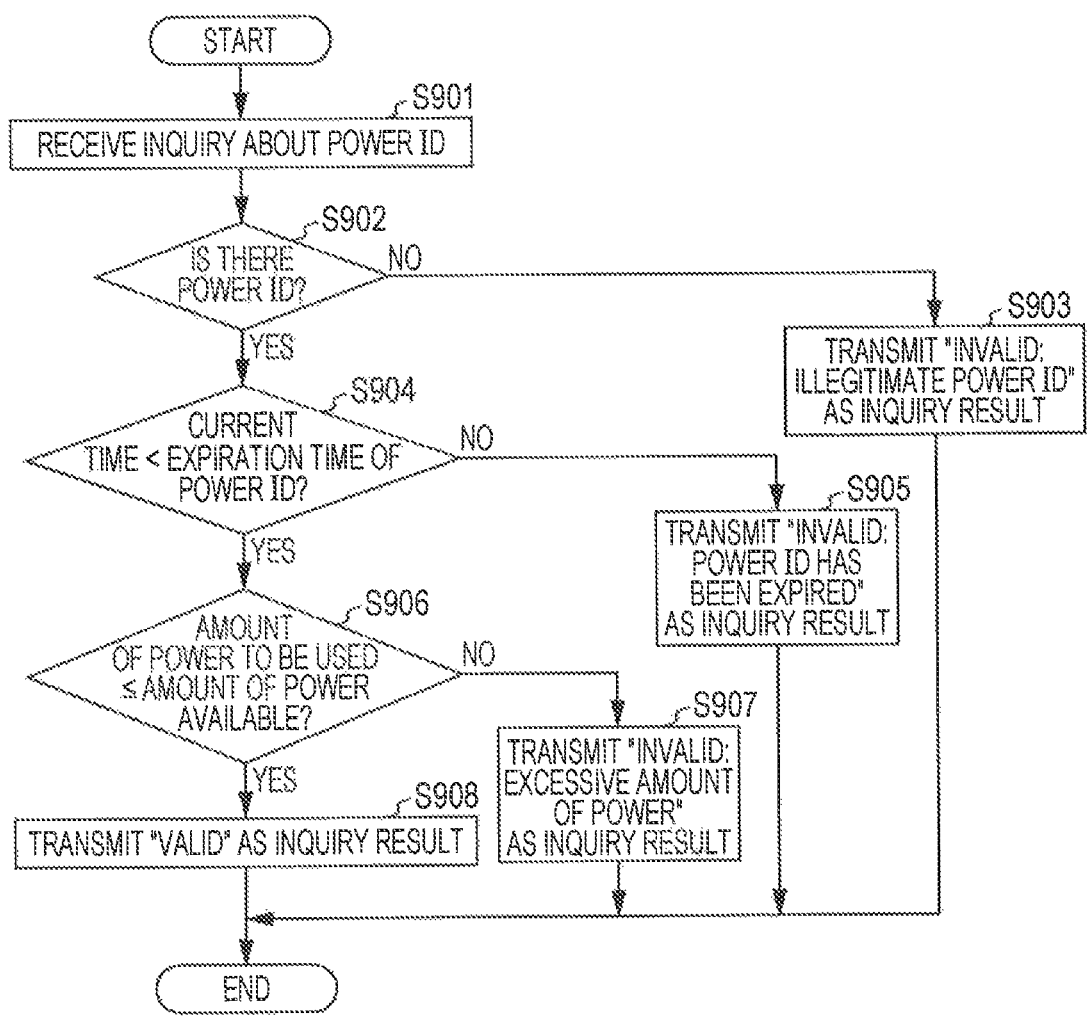
FIG. 19 is a flowchart illustrating a process for inquiring about a power ID performed by the power management apparatus according to the first embodiment.

FIG. 19 is a flowchart illustrating the process for inquiring about a power ID performed by the power management apparatus 41 according to the present embodiment. The flowchart of FIG. 19 illustrates the processing performed by the power management apparatus 41 in step S13 illustrated in FIG. 12.

In step S901, the power supply possibility determination unit 425 of the power management apparatus 41 receives an inquiry about a power ID from the power supply apparatus 10 through the communication unit 423. The received inquiry about a power ID includes a power ID and the amount of power to be supplied from the power supply apparatus 10. The inquiry about a power ID is transmitted from the power supply apparatus 10 (step S112 illustrated in FIG. 13).

In step S902, the power supply possibility determination unit 425 determines whether the power ID included in the inquiry about the power ID received in step S901 exists in the power ID management table T20. If the power ID exists, the process proceeds to step S904. On the other hand, if the power ID does not exist, the process proceeds to step S903.

In step S903, the power supply possibility determination unit 425 transmits "invalid: illegitimate power ID" through the communication unit 423 as an inquiry result (corresponds to step S113 illustrated in FIG. 13). The inquiry result "invalid: illegitimate power ID" indicates that because the power ID received in step S901 is illegitimate, the power supply apparatus 10 cannot supply power using the power ID. The power supply apparatus 10 is therefore prohibited from supplying power using the power ID.

In step S904, the power supply possibility determination unit 425 determines whether the expiration time of the power ID has come. If the expiration time of the power ID has not come, the process proceeds to step S906. On the other hand, if the expiration time of the power ID has come (that is, the power ID has expired), the process proceeds to step S905.

In step S905, the power supply possibility determination unit 425 transmits "invalid: power ID has expired" through the communication unit 423 as the inquiry result (corresponds to step S113 illustrated in FIG. 13). The inquiry result "invalid: power ID has expired" indicates that because the power ID received in step S901 has expired, the power supply apparatus 10 cannot supply power using the power ID. The power supply apparatus 10 is therefore prohibited from supplying power using the power ID.

In step S906, the power supply possibility determination unit 425 determines whether or not the amount of power included in the inquiry about the power ID received in step S901 is equal to or smaller than the amount of power available corresponding to the power ID included in the inquiry about a power ID. The amount of power available corresponding to the power ID is managed in the power ID management table T20. If the amount of power is equal to or smaller than the amount of power available, the process proceeds to step S908. On the other hand, if the amount of power is not equal to or smaller than the amount of power available, the process proceeds to step S907.

In step S907, the power supply possibility determination unit 425 transmits "invalid: excessive amount of power" through the communication unit 423 as the inquiry result (corresponds to step S113 illustrated in FIG. 13). The inquiry result "invalid: excessive amount of power" indicates that because the amount of power included in the inquiry about a power ID exceeds the amount of power that can be supplied from the power supply apparatus 10 using the power ID included in the inquiry about a power ID received in step S901, the power supply apparatus 10 cannot supply power using the power ID. The power supply apparatus 10 is therefore prohibited from supplying power using the power ID.

In step S907, the power supply possibility determination unit 425 may transmit "valid: within amount of power available" through the communication unit 423 as the inquiry result (not illustrated). The inquiry result "valid: within amount of power available" indicates that the power supply apparatus 10 may supply an amount of power that can be supplied from the power supply apparatus 10 using the power ID included in the inquiry about a power ID received in step S901 (that is, power that does not cause a charging process) and that is equal to or smaller than the amount of power available.

In step S908, the power supply possibility determination unit 425 transmits "valid" through the communication unit 423 as the inquiry result (corresponds to step S113 illustrated in FIG. 13). The inquiry result "valid" indicates that the power supply apparatus 10 can supply power using the power ID included in the inquiry about a power ID received in step S901.

As a result of the above process, the power management apparatus 41 can appropriately respond to the inquiry about the power ID from the power supply apparatus 10.

FIG. 20 is a flowchart illustrating the process for updating the amount of surplus power used performed by the power management apparatus 41 according to the present embodiment. The flowchart of FIG. 20 illustrates the processing performed by the power management apparatus 41 in step S14 illustrated in FIG. 12.

In step S1001, the surplus power use history management unit 426 of the power management apparatus 41 receives a power supply report through the communication unit 423. The power supply report includes a power ID and the amount of power supplied by the power supply apparatus 10 using the power ID. The power supply report is transmitted from the power supply apparatus 10 (step S115 illustrated in FIG. 13).

In step S1002, the surplus power use history management unit 426 updates the amount of power available corresponding to the power ID by subtracting the amount of power included in the power supply report received in step S1001 from the amount of power available stored in the power ID management table T20.

In step S1003, the surplus power use history management unit 426 registers the amount of power included in the power supply report received in step S1001 to the surplus power use information table T30 as the amount of power supplied.

As a result of the above process, the power management apparatus 41 updates various pieces of information on the basis of the received power supply report.

FIG. 21 is a flowchart illustrating the process for calculating an electricity bill in the settlement process according to the present embodiment.

In step S1101, the settlement process unit 427 of the power management apparatus 41 calculates a price A corresponding to the amount of power purchased a in the home 20 of the user U1. The amount of power purchased a is obtained from the amount of power indicated by the meter 25, that is, the amount of power purchased a is an accumulated value of the amount of power purchased stored in the power information management table T40 over a certain period.

In step S1102, the settlement process unit 427 calculates the amount of power sold b. The amount of power sold b is obtained from the amount of power indicated by the meter 23, that is, the amount of power sold b is an accumulated value of the amount of power sold stored in the power information management table T40 over the certain period.

In step S1103, the settlement process unit 427 calculates the amount of surplus power used c. The amount of surplus power used c is, in the surplus power, the amount of power supplied from the power supply apparatus 10, that is, the amount of surplus power used c is an accumulated value of the amount of surplus power supplied stored in the power supply apparatus use information table T50 over the certain period.

In step S1104, the settlement process unit 427 calculates a price D corresponding to the amount of power purchased d from the power supply apparatus 10. The amount of power purchased d indicates the amount of grid power supplied from the power supply apparatus 10, that is, the amount of power purchased d is an accumulated value of the amount of grid power supplied stored in the power supply apparatus use information table T50 over the certain period.

In step S1105, the settlement process unit 427 calculates an electricity bill using the following expression 1 on the basis of the prices A and D, the amount of power sold b, and the amount of surplus power used c calculated in steps S1101 to S1104.

$$\text{Electricity bill} = A + (b-c) \times \text{unit price of power sold} + D \quad (1)$$

After step S1105, the settlement process unit 427 asks the user U1 to pay the electricity bill.

As a result of the above process, the power management apparatus 41 settles the electricity bill after calculating the electricity bill for the user U1.

As described above, in the power management system 1 according to the present embodiment, surplus power caused in a home of a user (consumer) is supplied to the power system (reverse flow) whereas the user can receive power from the power system at a place different from the user's home. As a result, the user can not only sell the surplus power but also receive power corresponding to the surplus power at another place. The power management system 1 can thus make wider use of surplus power.

Second Embodiment

In a second embodiment, a power management system will be described capable of making wider use of surplus power caused in a user's home by consuming the surplus power for a person different from the user at a place different from the user's home. In the following description, the user will be referred to as a "user U1", and the person different from the user will be referred to as a "user U2".

In the present embodiment, the same components as those according to the first embodiment are given the same reference numerals, and detailed description thereof is omitted.

First, a case in which the power management system according to the present embodiment manages power will be described while taking an example. The power management performed by the power management system according to the present embodiment, however, is not limited to this example.

Both the user U1 and the user U2 use a social networking service (SNS) sites on the Internet. A power generation apparatus is installed in the home 20 of the user U1 and is generating power. The user U2 is on his/her travels and driving an EV. When the user U1 likes content posted on the SNS site by the user U2 during the travel, the user U1 desires to provide surplus power caused in the home thereof for the user U2. The user U2 stops at a rest area in which a power supply apparatus is installed and charges the EV. The power management system performs management such that the surplus power caused in the home 20 of the user U1 offsets the power supplied to the EV of the user U2 from the power supply apparatus. The power management system that manages power in this manner will be specifically described hereinafter.

Figure 22:
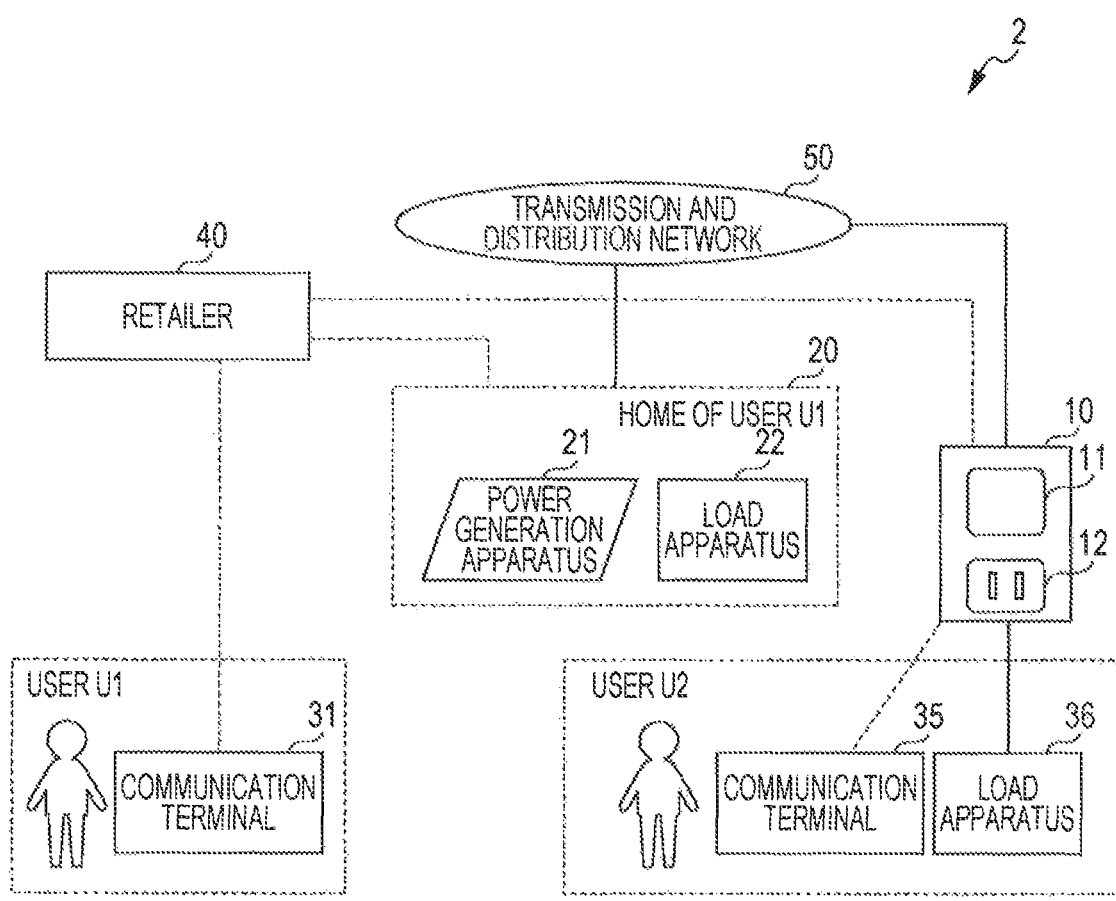
FIG. 22 is an overview of the configuration of a power management system according to a second embodiment.
Figure 23:
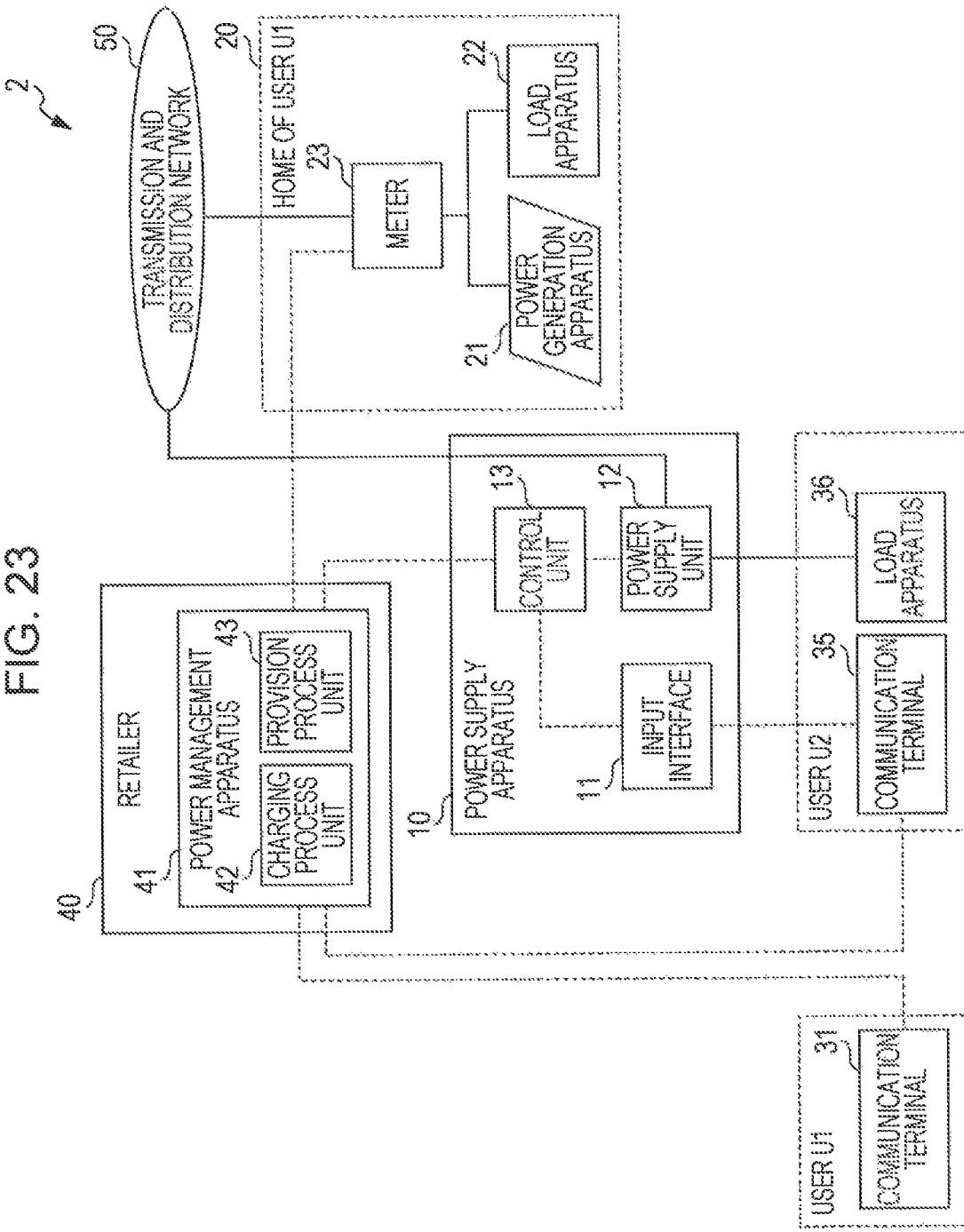
FIG. 23 is a block diagram illustrating the configuration of the power management system according to the second embodiment.

FIG. 22 is an overview of the configuration of a power management system according to the present embodiment. FIG. 23 is a block diagram illustrating the configuration of the power management system 2 according to the present embodiment. The power management system 2 will be described with reference to these drawings.

In the power management system 2, there are two users, namely the user U1 and the user U2. The power management system 2 is different from the power management system 1 according to the first embodiment in that the user (user U1) who owns a power generation apparatus at home and the user (user U2) who receives power from a power supply apparatus are different from each other.

The power generation apparatus 21, the load apparatus 22, and the meter 23 are installed in the home 20 of the user U1. The user U1 owns the communication terminal 31. The user U1 may stay at the home 20 thereof, or may stay outside the home 20.

The user U2 stays near the power supply apparatus 10. The user U2 owns a communication terminal 35 and a load apparatus 36. The communication terminal 35 and the load apparatus 36 have the same functions as the communication terminal 31 and the load apparatus 32, respectively, according to the first embodiment.

Figure 24:
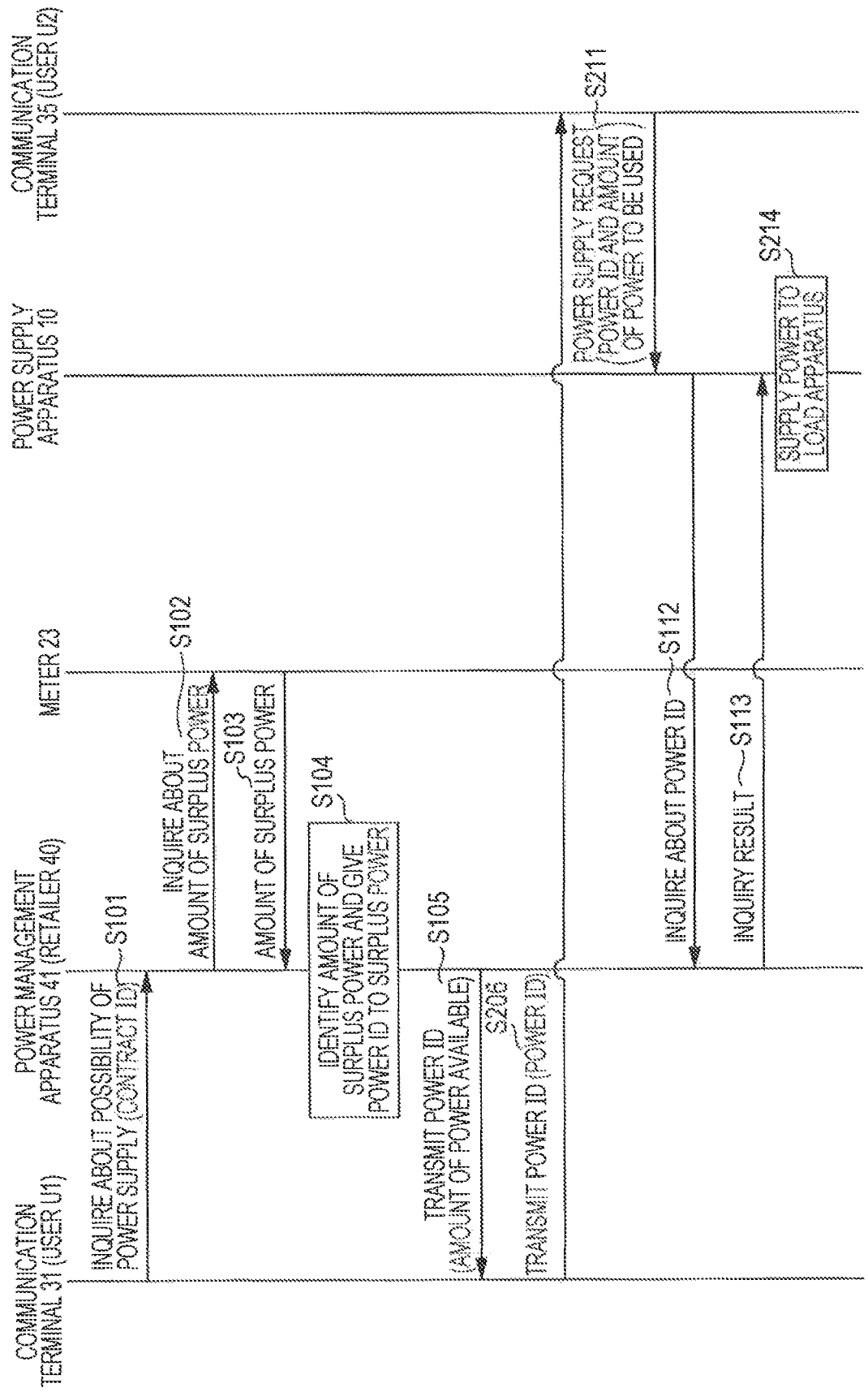
FIG. 24 is a first sequence diagram illustrating transmission of information in the power management system according to the second embodiment.

FIG. 24 is a first sequence diagram illustrating transmission of information in the power management system 2 according to the present embodiment. A process performed by the power management system 2 will be described with reference to FIG. 24. Detailed description of the same processing steps as those for the power management system 1 according to the first embodiment is omitted.

In steps S101 to S105, the communication terminal 31 inquires about the possibility of power supply and receives a power ID.

In step S206, the communication terminal 31 transmits the power ID to the communication terminal 35. The power ID transmitted here is one given to the surplus power caused in the home 20 of the user U1. Since the communication terminal 31 transmits the power ID to the communication terminal 35, the user U2 can use the surplus power caused in the home 20 of the user U1.

After the communication terminal 31 transmits the power ID to the communication terminal 35, the power ID held by the communication terminal 31 may be deleted. In doing so, the communication terminal 31 (user U1) can be prohibited from supplying power to the load apparatus 22 from the power supply apparatus 10 using the power ID. That is, the power ID can be appropriately transferred or moved from the user U1 to the user U2.

When transmitting the power ID to the communication terminal 35, the communication terminal 31 may generate a new power ID (also referred to as a "second power ID" or "second identification information") associated with the power ID (also referred to as a "first power ID") and transmit the generated second power ID to the communication terminal 35. In this case, the power management apparatus 41 invalidates the first power ID. In doing so, the communication terminal 35 (user U2) is allowed to supply power to the load apparatus 36 using the second power ID, whereas the communication terminal 31 (user U1) is prohibited from supplying power to the load apparatus 22. In this method, too, the power ID can be appropriately transferred or moved from the user U1 to the user U2.

In step 3211, the communication terminal 35 transmits a power supply request to the power supply apparatus 10. The power supply request includes the power ID transmitted from the communication terminal 31 in step S206 and the amount of power to be used, which is the amount of power that the user U2 desires to receive.

In steps S112 and S113, an inquiry about the power ID obtained from the power supply request in step S211 is made.

In step 3214, the power supply apparatus 10 supplies power to the load apparatus 36 connected thereto.

Although the communication terminal 31 transmits the power ID to the communication terminal 35 in step S206 after the power management apparatus 41 transmits the power ID to the communication terminal 31 in step 3105 in the above description, the power management apparatus 41 may transmit the power ID to the communication terminal 35, instead. In doing so, the communication terminal 35 can obtain the power ID without using the communication terminal 31, which increases usability.

As described above, according to the power management system 2, if the communication terminal 31 transmits a power ID and an accumulated value of the amount of surplus power to the communication terminal 35, which is used by the user U2, and the communication terminal 35 transmits, to the power supply apparatus 10, a second power supply request indicating that the user U2 desires to receive power with the load apparatus 36, which is used by the user U2 and different from the load apparatus 32, the power supply apparatus 10 supplies an amount of first power equal to or smaller than the amount of surplus power to the load apparatus 36 as power that does not cause a charging process.

If the first power ID and the temporary second power ID, which is different from the first power ID, are issued and associated with an accumulated value of the amount of surplus power in a time period in accordance with the inquiry about the possibility of power supply, the first power ID, the second power ID, and the accumulated value of the amount of surplus power in the time period are transmitted to the communication terminal 31, the communication terminal 31 transmits the second power ID and the accumulated value of the amount of surplus power to the communication terminal 35 used by the user U2, the communication terminal 35 transmits, to the power supply apparatus 10, a second power supply request indicating that the user U2 desires to receive power with the load apparatus 36, which is used by the user U2 and different from the load apparatus 32, and the power supply apparatus 10 supplies an amount of first power equal to or smaller than the amount of surplus power to the load apparatus 36 as power that does not cause a charging process, the first power is prohibited from being supplied to the load apparatus 32.

As a result, it is possible to make wider use of surplus power caused in a home of a user by consuming the surplus power for a person different from the user at a place different from the user's home.

Third Embodiment

In a third embodiment, a power management system will be described capable of making wider use of surplus power by consuming surplus power that will be caused in a user's home in the future for a person different from the user at a place different from the user's home.

In the present embodiment, the same components as those according to the first or second embodiment are given the same reference numerals, and detailed description thereof is omitted.

First, a case in which the power management system according to the present embodiment manages power will be described while taking an example. Power management performed by the power management system according to the present embodiment, however, is not limited to this example.

Although the surplus power caused in the home 20 of the user U1 is provided for the user U2 in the second embodiment, the user U1 desires to provide surplus power that will be caused in the home 20 of the user U1 in the future for the user U1 in the present embodiment.

The user U2 stops at a rest area in which a power supply apparatus is installed and charges the EV. The power management system performs management such that the surplus power caused in the home 20 of the user U1 in a time period in which the EV is charged offsets the power supplied to the EV of the user U2 from the power supply apparatus. The power management system that manages power in this manner will be specifically described hereinafter.

The configuration of the power management system according to the present embodiment is the same as that of the power management system 2 according to the second embodiment.

Figure 25:
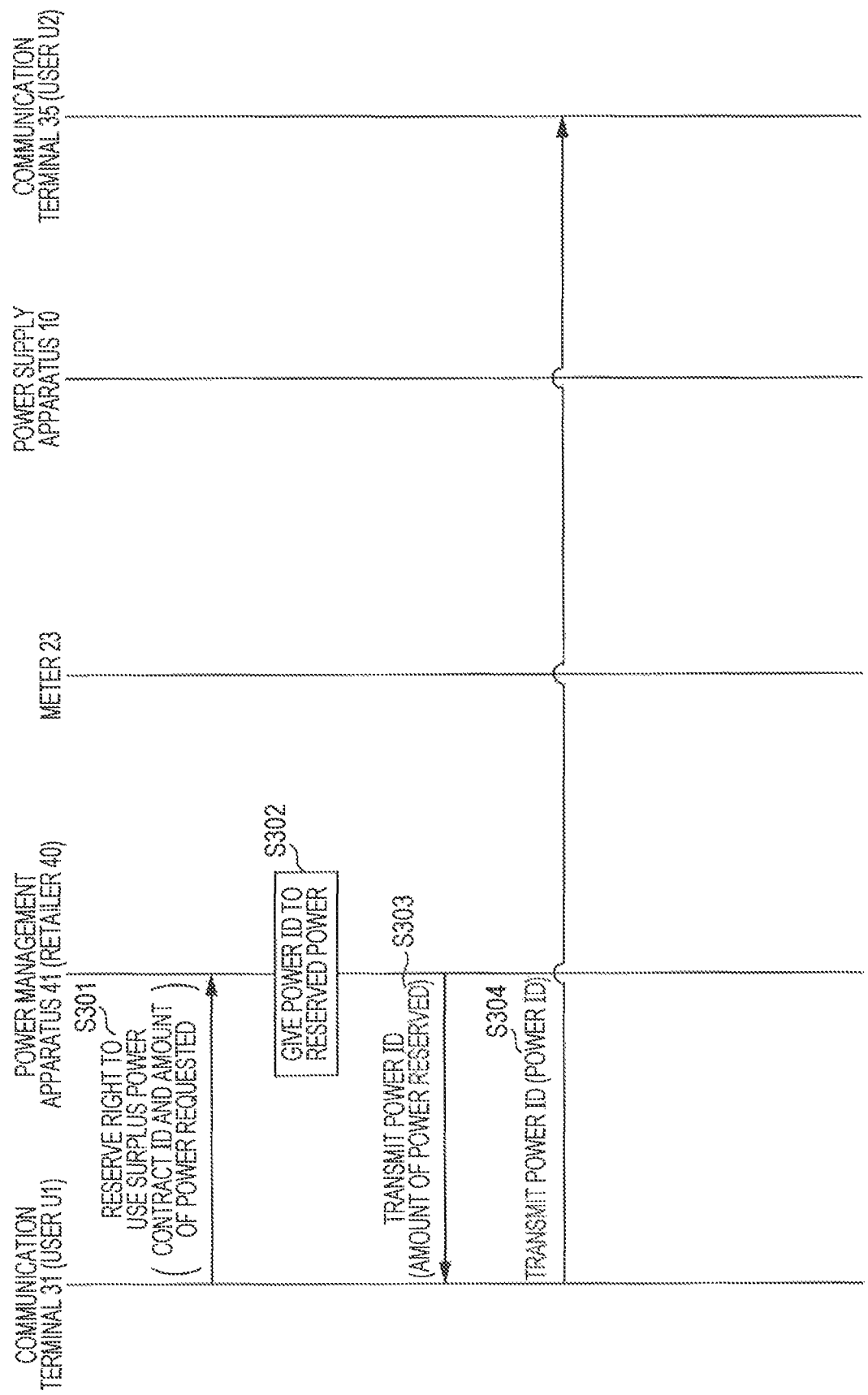
FIG. 25 is a first sequence diagram illustrating transmission of information in a power management system according to a third embodiment.

FIG. 25 is a first sequence diagram illustrating transmission of information in the power management system in the present embodiment. A process performed by the power management system according to the present embodiment will be described with reference to FIG. 25.

In step S301, the communication terminal 31 reserves a right to use surplus power. The right to use surplus power is a right to use surplus power that will be caused in the future.

Since the user U1 reserves the right to use surplus power using the communication terminal 31, the right to use surplus power that will be caused by the power generation apparatus 21 can be defined. When reserving the right to use surplus power, the communication terminal 31 transmits a contract ID and the amount of power requested to the power management apparatus 41. The amount of power requested is the amount power requested to be used in the future.

A time limit may be provided for the surplus power to be used. That is, in the surplus power caused in the future, the user U1 may receive a right to use only surplus power caused in a certain time period. Alternatively, the user U1 may receive a right to use only surplus power caused in time periods other than a certain time period. In this case, the user U1 specifies the certain time period in step S301.

In step S302, the power management apparatus 41 gives a power ID to reserved power. The power management apparatus 41 gives the power ID to power corresponding to the amount of power requested included in the reservation of the right to use surplus power received in step S301. The power corresponding to the amount of power requested is the surplus power that will be caused in the future.

If the certain time period is specified in step S301, the power management apparatus 41 gives a power ID to surplus power that will be caused in the specified certain time period or surplus power that will be caused in the time periods other than the specified certain time period.

Alternatively, the power management apparatus 41 may reserve only surplus power corresponding to part of the amount of power requested specified in step S301. More specifically, the power management apparatus 41 determines whether to reserve surplus power corresponding to all the amount of power requested specified in step S301. If the power management apparatus 41 determines that it is difficult to reserve surplus power corresponding to all the amount of power requested, the power management apparatus 41 may reserve only surplus power corresponding to part of the amount of power requested.

In step S303, the power management apparatus 41 transmits, to the communication terminal 31, the power ID given in step S302. At this time, the power management apparatus 41 transmits a value indicating the reserved amount of surplus power to the communication terminal 31 as the amount of power reserved.

In step S304, the communication terminal 31 transmits, to the communication terminal 35 (user U2), the power ID transmitted in step S303.

Figure 26:
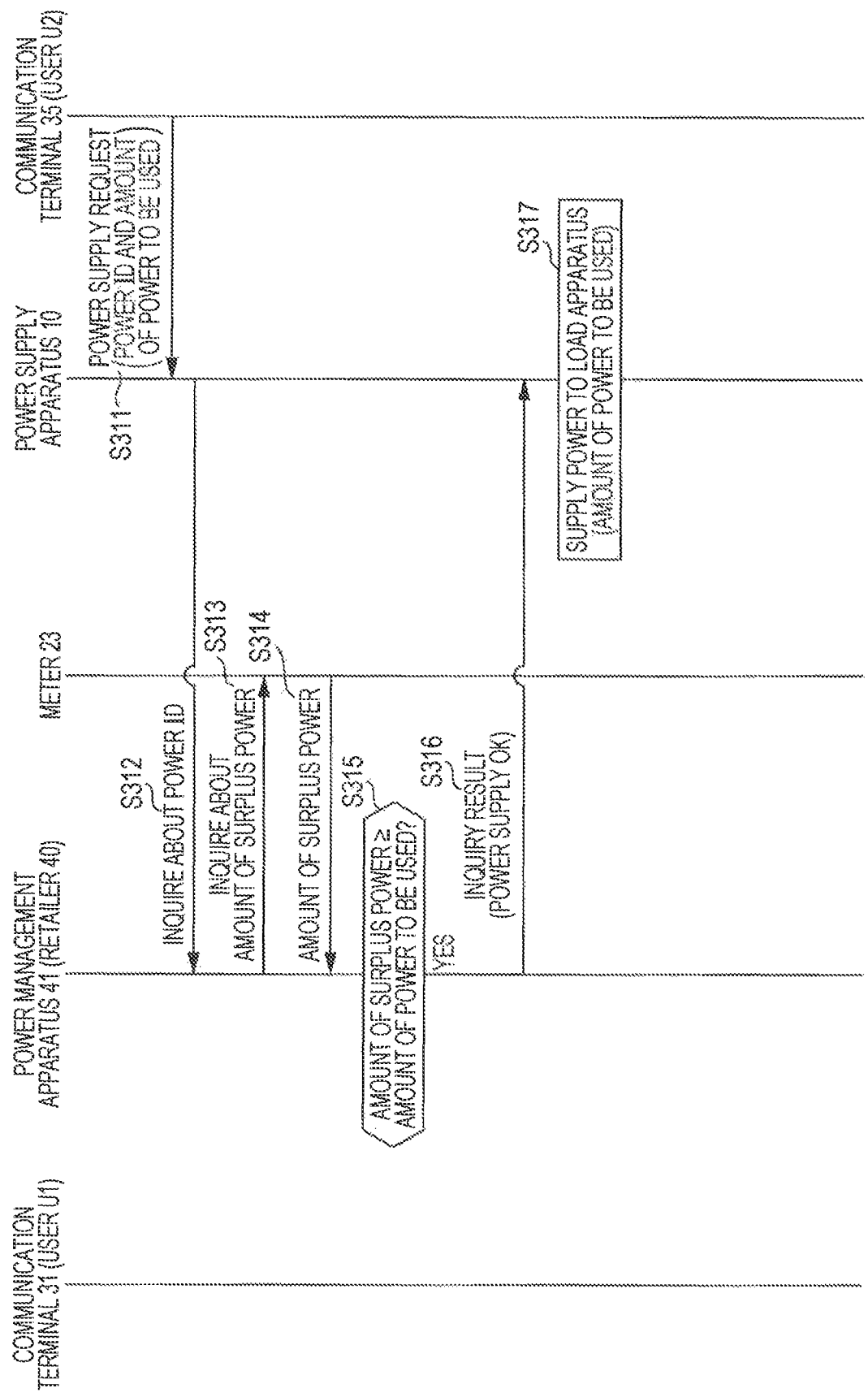
FIG. 26 is a second sequence diagram illustrating the transmission of information in the power management system according to the third embodiment.
Figure 27:
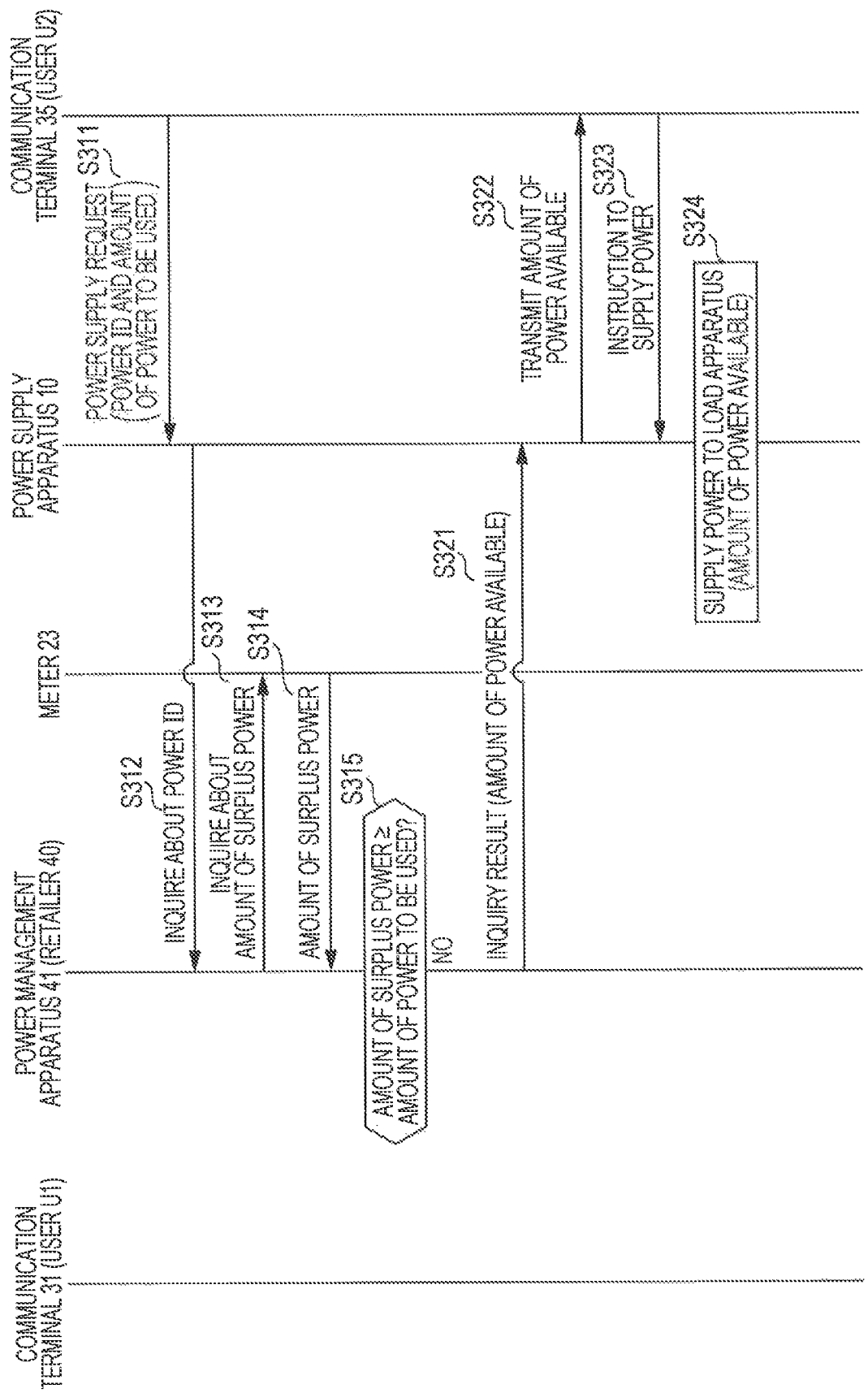
FIG. 27 is a third sequence diagram illustrating the transmission of information in the power management system according to the third embodiment.

FIGS. 26 and 27 are second and third sequence diagrams illustrating the transmission of information in the power management system according to the present embodiment.

In step S311, the communication terminal 35 transmits a power supply request to the power supply apparatus 10. The power supply request includes the power ID transmitted from the communication terminal 31 in step S304 and the amount of power to be used, which is the amount of power that the user U2 desires to receive.

In step S312, the power supply apparatus 10 inquires of the power management apparatus 41 about the power ID obtained as a result of power supply request transmitted in step S311. Step S312 is the same as step S112 in the first embodiment.

In step S313, the power management apparatus 41 transmits an inquiry about the amount of surplus power to the meter 23 of the home 20 of the user U1.

In step S314, the meter 23 transmits the amount of surplus power to the power management apparatus 41 in accordance with the inquiry about the amount of surplus power received from the power management apparatus 41 in step S313.

In step S315, the power management apparatus 41 determines the amount of actual surplus power. More specifically, the power management apparatus 41 determines whether or not the amount of surplus power in the time period is equal to or larger than the amount of surplus power to be used included in the power supply request transmitted in step S311.

If the power management apparatus 41 determines in step S315 that the amount of surplus power is equal to or larger than the amount of power to be used (YES in step S315), processing in steps S316 and S317 is performed. On the other hand, if the power management apparatus 41 determines in step S315 that the amount of surplus power is not equal to or larger than the amount of power to be used (that is, if the amount of surplus power is smaller than the amount of power to be used) (NO in step S315), processing in steps S321 to S324 illustrated in FIG. 27 is performed.

In step S316, the power management apparatus 41 transmits, to the power supply apparatus 10, a result of the inquiry about the power ID transmitted in step 3312. More specifically, since the amount of surplus power is equal to or larger than the amount of power to be used, the power management apparatus 41 notifies the power supply apparatus 10 that power may be supplied.

In step S317, the power supply apparatus 10 supplies power corresponding to the amount of power to be used to the load apparatus 36 connected thereto.

In step S321, the power management apparatus 41 transmits, to the power supply apparatus 10, a result of the inquiry about the power ID transmitted in step S312. More specifically, since the amount of surplus power is smaller than the amount of power to be used, the power management apparatus 41 transmits a value indicating the amount of power available to the power supply apparatus 10.

In step S322, the power supply apparatus 10 transmits, to the communication terminal 35, the value indicating the amount of power available transmitted in step S321. The communication terminal 35 displays, to the user U2, the value indicating the amount of power available transmitted in step S322 and might receive, from the user U2, an instruction to receive power corresponding to the amount of power available from the power supply apparatus 10.

In step S323, the communication terminal 35 transmits the instruction to receive power to the power supply apparatus 10. The instruction to receive power is issued if the user U2 determines in step S322 to receive the power corresponding to the amount of power available.

In step S324, the power supply apparatus 10 supplies the power corresponding to the amount of power available to the load apparatus 36 connected thereto.

Although the power management apparatus 41 gives a power ID to reserved power in step S302 in the above description, the power management apparatus 41 may wait until the surplus power is actually caused, instead. In this case, the power management apparatus 41 may give a power ID to the surplus power after the surplus power is actually caused, and transmit the power ID to the communication terminal 31. In doing so, upon receiving the power ID in step S304, the communication terminal 35 can instruct the power supply apparatus 10 to supply the power to the load apparatus 36 on the basis of the actual surplus power.

Although the communication terminal 31 reserves a right to use surplus power using the contract ID and the amount of power requested in step S301 in the above description, the communication terminal 31 may also use specification information for specifying the user U2. In this case, after the surplus power is actually caused, the power management apparatus 41 can give a power ID to the surplus power and transmit the power ID to the communication terminal 35. In doing so, the communication terminal 35 can obtain the power ID without using the communication terminal 31 and instruct the power supply apparatus 10 to supply power to the load apparatus 36 on the basis of the actual surplus power.

Modifications of Embodiments

The power management system according to each of the above embodiments can be implemented in the following manner.

Figure 28:
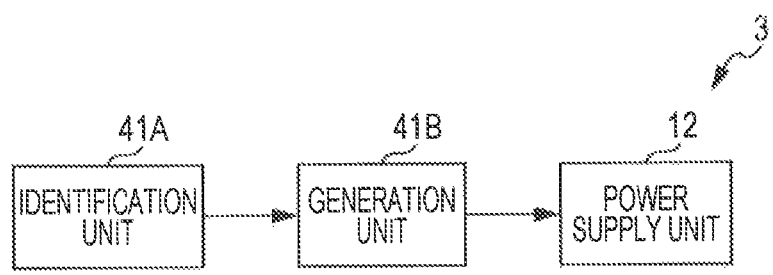
FIG. 28 is a block diagram illustrating another example of the configuration of the power management system according to each embodiment.

FIG. 28 is a block diagram illustrating another example of the configuration of the power management system according to each of the above embodiments.

A power management system 3 includes a power generation apparatus connected to a power system, a power supply apparatus connected to the power system, and a load apparatus connected to the power supply apparatus. As illustrated in FIG. 28, the power management system 3 includes an identification unit 41A that identifies surplus power, which is, in power generated by the power generation apparatus, power supplied to the power system, a generation unit 41B that generates first identification information associated with the surplus power, and the power supply unit 12 that supplies an amount of first power equal to or smaller than the amount of surplus power associated with the first identification information from the power system to the load apparatus through the power supply apparatus holding the first identification information.

Figure 29:
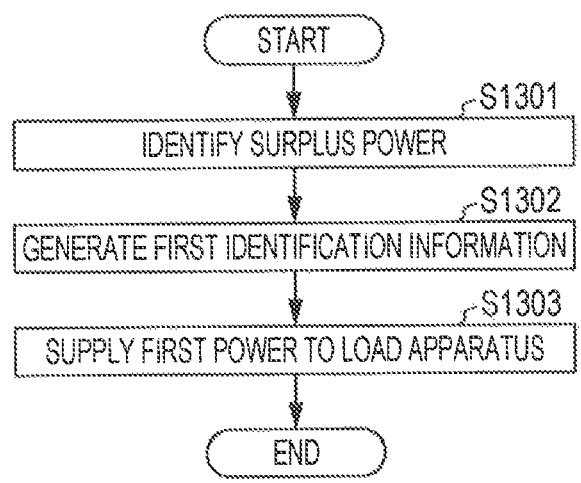
FIG. 29 is a flowchart illustrating a power management method in the power management system according to each embodiment.

FIG. 29 is a flowchart illustrating a power management method performed by the power management system according to each of the above embodiments.

In step S1301, surplus power, which is, in the power generated by the power generation apparatus, power supplied to the power system, is identified.

In step S1302, the first identification information to be associated with the surplus power is generated.

In step 31303, an amount of first power equal to or smaller than the amount of surplus power associated with the first identification information is supplied from the power system to the load apparatus through the power supply apparatus holding the first identification information.

The components in each of the above embodiments may be configured by dedicated hardware or by executing a software program suitable for the components. Alternatively, the components may be realized by a program execution unit such as a central processing unit (CPU) or a processor that reads and executes a software program recorded on a recording medium such as a hard disk or a semiconductor memory. A software program that realizes the power management system according to each of the above embodiments or the like is as follows.

That is, the software program is the program stored in a non-transitory computer-readable recording medium storing a program for causing a computer to implement a power management method used in a power management system including a power generation apparatus corresponding to first user identification information, a first load apparatus used by a user corresponding to the first user identification information, and a power supply apparatus capable of supplying power to the first load apparatus and installed in a place different from the power generation apparatus. The method includes receiving, from a meter that measures the amount of surplus power, which is, in power generated by the power generation apparatus, power supplied from the power generation apparatus to a power system, a surplus power value indicating the amount of surplus power, receiving, from a first communication terminal used by the user corresponding to the first user identification information, an inquiry about power supply in which the surplus power is used in a first time period that lasts a certain unit time, the inquiry being associated with the first user identification information, issuing, in accordance with the inquiry, first power identification information for validating power supply performed by the power supply apparatus using the surplus power corresponding to the first time period for an accumulated value of the amount of surplus power corresponding to the first time period, transmitting the first power identification information and the accumulated value of the amount of surplus power corresponding to the first time period to the first communication terminal, and causing the power supply apparatus that has received a first power supply request, which is associated with the first power identification information, indicating that power is to be supplied to the first load apparatus to supply an amount of first power equal to or smaller than the amount of surplus power to the first load apparatus as power that does not cause a charging process.

That is, the software program may be the program stored in a computer-readable recording medium storing a program for causing a computer to implement a power management method used in a power management system including a power generation apparatus connected to a power system and a power supply apparatus that is connected to the power system and that supplies power to a load apparatus. The method includes identifying surplus power, which is, in power generated by the power generation apparatus, power to be supplied to the power system, generating first identification information to be associated with the surplus power, and supplying an amount of first power equal to or smaller than the amount of surplus power associated with the first identification information from the power system to the load apparatus through the power supply apparatus that has obtained the generated first identification information.

Part or all of the above embodiments can be described as follows, but are not limited to the following description.

(1) A power management method used in a power management system including a power generation apparatus connected to a power system and a power supply apparatus that is connected to the power system and that supplies power to a load apparatus includes identifying surplus power, which is, in power generated by the power generation apparatus, power supplied to the power system, generating first identification information to be associated with the surplus power, and supplying an amount of first power equal to or smaller than the amount of surplus power associated with the first identification information from the power system to the load apparatus through the power supply apparatus that has obtained the generated first identification information.

(2) In the method according to (1), if the power supply apparatus has not obtained the first identification information, second power that causes a charging process may be supplied from the power system to the load apparatus through the power supply apparatus, and if the power supply apparatus has obtained the first identification information, the first power that does not cause a charging process may be supplied to the load apparatus.

(3) In the method according to (2), the power supply apparatus may include a receiver used for paying money for the supplied power. The method may further include receiving money using the receiver if the second power has been supplied and not receiving money using the receiver if the first power has been supplied.

(4) The method according to any of (1) to (3) may further include performing, if the surplus power is supplied to the power system, a process for providing a price corresponding to the amount of surplus power. If the first power has been supplied, a process for providing a price corresponding to the amount of power obtained by subtracting the amount of first power from the amount of surplus power may be performed in the provision process.

(5) The method according to any of (1) to (4) may further include transmitting the first identification information to a first communication terminal of a first user, who owns the power generation apparatus, and, if the first communication terminal transmits, to the power supply apparatus using the first identification information, a request indicating that power is to be supplied from the power supply apparatus, supplying the first power to the load apparatus.

(6) The method according to (5) may further include transmitting the first identification information from the first communication terminal to a second communication terminal of a second user, who is different from the first user who owns the power generation apparatus, and, if the second communication terminal transmits, to the power supply apparatus using the first identification information, a request indicating that power is to be supplied from the power supply apparatus, supplying the first power to the load apparatus.

(7) In the method according to (6), if the first identification information is transmitted, the first identification information held by the first communication terminal may be deleted after the first identification information is transmitted.

(8) The method according to (6) may further include generating, if the first identification information is transmitted, second identification information associated with the first identification information but different from the first identification information, transmitting the generated second identification information from the first communication terminal to the second communication terminal, supplying the first power from the power system to the load apparatus through the power supply apparatus that has obtained the second identification information, and prohibiting the power supply apparatus that has obtained the first identification information from supplying the first power.

(9) In the method according to (8), if the first identification information is generated before the identified surplus power is actually caused, the generated first identification information may be transmitted to the second communication terminal after the surplus power is actually caused.

(10) The method according to (6) may further include receiving specification information for specifying the second user, and, if the first identification information is generated before the identified surplus power is actually caused, transmitting the generated first identification information to the communication terminal of the second user specified by the specification information after the surplus power is actually caused.

(11) In the method according to any of (1) to (10), in the power management system, power supply-demand balance may be adjusted in each time period, and the power supply apparatus may supply the first power in the same time period in which the power generation apparatus supplies the surplus power to the power system.

(12) The method according to any of (1) to (11) may further include measuring, in the power generated by the power generation apparatus in a period from a start of a time period including a first time to the first time, power supplied to the power system, identifying the measured power as the surplus power, and supplying an amount of first power equal to or smaller than the amount of surplus power to the load apparatus.

(13) The method according to (12) may further include identifying power obtained by adding estimated surplus power, which is, in power estimated to be generated by the power generation apparatus in a period from the first time to an end of the time period, power estimated to be supplied to the power system, to the surplus power as new surplus power, and supplying an amount of first power equal to or smaller than the amount of new surplus power to the load apparatus.

(14) A power management system including a power generation apparatus connected to a power system and a power supply apparatus that is connected to the power system and that supplies power to a load apparatus includes an identifier that identifies surplus power, which is, in power generated by the power generation apparatus, power supplied to the power system, a generator that generates first identification information to be associated with the surplus power, and a power supplier that supplies an amount of first power equal to or smaller than the amount of surplus power associated with the first identification information from the power system to the load apparatus through the power supply apparatus that has obtained the generated first identification information.

According to (1), in the power management system, the surplus power caused in a home of a user (consumer) is supplied to the power system (reverse flow) whereas the power system supplies power at a place different from the users home. As a result, the user can not only sell the surplus power but also receive an amount of power corresponding to the amount of surplus power at another place. The power management system can thus make wider use of surplus power.

According to (2), in the power management system, the user need not pay for the power supplied from the power supply apparatus. Since the power management system performs management such that the surplus power offsets the power supplied from the power supply apparatus, the user need not pay for the power supplied from the power supply apparatus. The user can therefore make wider use of surplus power without paying extra money.

According to (3), the power management system does not receive money corresponding to the power supplied from the power supply apparatus. Since the power management system performs management such that the surplus power offsets the power supplied from the power supply apparatus, the power management system does not receive the money corresponding to the power supplied from the power supply apparatus. The user can therefore make wider use of surplus power without paying extra money.

According to (4), the power management system provides, for the user, a price corresponding to the amount of power obtained by subtracting the amount of power supplied from the power supply apparatus from the amount of surplus power. The user can therefore make wider use of surplus power without paying extra money.

According to (5) the power management system supplies power to the load apparatus after the first identification information is input to the power supply apparatus. The user can supply power to the load apparatus by inputting the first identification information to the power supply apparatus. In doing so, the user can intuitively understand a time to supply power to the load apparatus, which improves usability.

According to (6), in the power management system, the surplus power caused in a home of a user (first user) is supplied to the power system (reverse flow) whereas a user (second user) who does not own a power generation apparatus can receive power from the power system. As a result, even users who do not own a power generation apparatus can use surplus power.

According to (7), the power management system can prohibit the first user from making the power supply apparatus supply power to his/her load apparatus using the first identification information after the first user transmits the first identification information to the second user. That is, the power management system can appropriately transfer or move the identification information from the first user to the second user.

According to (8), in the power management system, the second user is allowed to supply power to his/her load apparatus using the second identification information whereas the first user is prohibited from supplying power to his/her load apparatus. That is, the power management system can appropriately transfer or move the identification information from the first user to the second user.

According to (9), the communication terminal that has received the identification information can supply power from the power supply apparatus to the load apparatus on the basis of the actual surplus power.

According to (10), the communication terminal that has received the identification information can obtain the identification information without using another communication terminal and supply power from the power supply apparatus to the load apparatus on the basis of the actual surplus power.

According to (11), the power management system can supply power to the load apparatus without disrupting the supply-demand balance in the time period. As a result, it is possible to avoid increasing a power procurement cost of a retailer.

According to (12), in the power management system, an amount of power corresponding to the amount of surplus power actually caused in the time period can be supplied to the load apparatus. As a result, it is possible to avoid increasing the power procurement cost of the retailer.

According to (13), in the power management system, the sum of the amount of surplus power actually caused in the time period and the amount of surplus power estimated to be caused in the time period can be supplied to the load apparatus. As a result, it is possible to avoid increasing the power procurement cost of a retailer.

According to (14), the same advantageous effects as above can be produced.

Although power management systems according to one or a plurality of aspects and the like have been described on the basis of embodiments, the present disclosure is not limited to these embodiments. The one or plurality of aspects may include modes obtained by modifying the above embodiments in manners that can be conceived by those skilled in the art or modes obtained by combining components in different embodiments, insofar as such modes do not deviate from the scope of the present disclosure.

The present disclosure can be used for a power management system capable of making wider use of surplus power.

What is claimed is:

1. A power management method used in a power management system including a power generation apparatus corresponding to first user identification information, a first load used by a user corresponding to the first user identification information, and a power supply apparatus capable of supplying power to the first load, the method comprising:
   receiving a surplus power value, indicating an amount of surplus power supplied from the power generation apparatus to a power system;
   receiving, from a first communication terminal used by the user corresponding to the first user identification information, an inquiry regarding a power supply using the surplus power in a first time period that lasts for a predetermined unit time, the inquiry being associated with the first user identification information;
   issuing, in accordance with the inquiry, first power identification information for allowing the power supply apparatus to supply power using the surplus power corresponding to the first time period, in association with an accumulated value of the amount of surplus power corresponding to the first time period;
   transmitting the first power identification information and the accumulated value of the amount of surplus power corresponding to the first time period, to the first communication terminal; and
   causing the power supply apparatus that has received a first power supply request, to supply an amount of power equal to or smaller than the accumulated value of the amount of surplus power, to the first load, as first power that does not cause a fee charging process, the first power supply request being associated with the first power identification information and requesting a power supply to the first load.

2. The method according to claim 1, wherein the first power supply request is input from the first communication terminal to the power supply apparatus.

3. The method according to claim 1, wherein the surplus power value is periodically received from a meter, and wherein, after the inquiry is received, surplus power values are accumulated from a start of the first time period including a reception time, at which the inquiry has been received, to the reception time, to generate the accumulated value of the amount of surplus power corresponding to the first time period.

4. The method according to claim 1, wherein, after the inquiry is received, a meter is requested to output surplus power values corresponding to the first time period including a reception time, at which the inquiry has been received, and wherein, after the surplus power values corresponding to the first time period are received from the meter, the surplus power values corresponding to the first time period are accumulated to generate the accumulated value of the amount of surplus power corresponding to the first time period.

5. The method according to claim 1, wherein the first power supply request includes an amount of power to be supplied to the first load.

6. The method according to claim 1, wherein, when the accumulated value of the amount of surplus power corresponding to the first time period is equal to or smaller than a predetermined minimum value, the first power identification information is not issued in association with the accumulated value of the amount of surplus power corresponding to the first time period.

7. The method according to claim 1,
wherein, when the accumulated value of the amount of surplus power corresponding to the first time period is equal to or smaller than a predetermined minimum value, the first power identification information and the accumulated value are not transmitted to the first communication terminal in accordance with the inquiry.

8. The method according to claim 1,
wherein, when the accumulated value of the amount of surplus power corresponding to the first time period is equal to or smaller than a predetermined minimum value, a notification indicating that the accumulated value of the amount of surplus power corresponding to the first time period is equal to or smaller than the predetermined minimum value is transmitted to the first communication terminal in accordance with the inquiry.

9. The method according to claim 1, further comprising:
receiving, from the power supply apparatus, an inquiry request including an amount of power to be supplied to the first load; and
outputting, when the amount of power included in the inquiry request exceeds the accumulated value of the amount of surplus power corresponding to the first time period, an instruction to prohibit the power supply apparatus from supplying power to the first load.

10. The method according to claim 1, further comprising:
receiving, from the power supply apparatus, an inquiry request including an amount of power to be supplied to the first load; and
causing, when the amount of power included in the inquiry request exceeds the accumulated value of the amount of surplus power corresponding to the first time period, the power generation apparatus to supply the amount of power equal to the accumulated value of the amount of surplus power corresponding to the first time period, to the first load as the first power that does not cause a fee charging process.

11. The method according to claim 1,
wherein, after the first time period ends, the power supply apparatus is stopped from supplying power using the surplus power corresponding to the first time period on the basis of the first power identification information.

12. The method according to claim 1,
wherein the power management system further includes a second load, which is different from the first load, and
wherein power obtained by subtracting power used by the second load from power generated by the power generation apparatus is determined as the surplus power.

13. The method according to claim 1,
wherein, when the power generation apparatus has not obtained the first power identification information, the power supply apparatus supplies second power that causes a fee charging process, to the first load.

14. The method according to claim 13,
wherein the power supply apparatus includes a receiver used for a process of paying money for supplied power, the method further comprising:
when the power supply device has supplied the second power to the first bad, causing the receiver to accept the process of paying money; and
when the power supply device has supplied the first power to the first load, prohibiting the receiver from performing the process of paying money.

15. The method according to claim 1, further comprising:
calculating a price corresponding to the amount of surplus power,
wherein, in the calculating, when the power supply apparatus has supplied the first power to the first load, a price corresponding to an amount of power obtained by subtracting an amount of the supplied first power from the accumulated value of the amount of surplus power is calculated.

16. The method according to claim 1,
wherein the first communication terminal transmits the first power identification information and the accumulated value of the amount of surplus power corresponding to the first time period, to a second communication terminal used by a user corresponding to second user identification information different from the first user identification information, and
wherein, when the second communication terminal has transmitted, to the power supply apparatus, a second power supply request requesting a power supply to a second load, which is used by the user corresponding to the second user identification information and is different from the first load, the power supply apparatus supplies an amount of power equal to or smaller than the amount of surplus power, to the second load, as the first power that does not cause a fee charging process.

17. The method according to claim 1,
wherein the first power identification information and temporary second power identification information different from the first power identification information are associated with the accumulated value of the amount of surplus power corresponding to the first time period and are issued in accordance with the inquiry,
wherein the first power identification information, the second power identification information, and the accumulated value of the amount of surplus power corresponding to the first time period are transmitted to the first communication terminal,
wherein the first communication terminal transmits the second power identification information and the accumulated value of the amount of surplus power to a second communication terminal used by a user corresponding to second user identification information different from the first user identification information,
wherein the second communication terminal transmits, to the power supply apparatus, a second power supply request requesting a power supply to a second load, which is used by the user corresponding to the second user identification information and is different from the first load, and
wherein, when the power supply apparatus has supplied an amount of power equal to or smaller than the amount of surplus power, to the second load, as the first power that does not cause a fee charging process, the power supply apparatus is prohibited from supplying the first power to the first load.

18. The method according to claim 1,
wherein the accumulated value of the amount of surplus power corresponding to the first time period includes a value obtained by adding surplus power values corresponding to a period from a start of the first time period including a reception time, at which the inquiry has been received, to the reception time, to an estimated accumulated value of the amount of surplus power from the reception time to an end of the first time period.

19. A power management system comprising:
a power generation apparatus corresponding to first user identification information;

a first load used by a user corresponding to the first user identification information;
a power supply apparatus capable of supplying power to the first load;
one or more memories; and
circuitry operative to:
receive a surplus power value, indicating an amount of surplus power supplied from the power generation apparatus to a power system;
receive, from a first communication terminal used by the user corresponding to the first user identification information, an inquiry regarding a power supply using the surplus power in a first time period that lasts for a predetermined unit time, the inquiry being associated with the first user identification information;
issue, in accordance with the inquiry, first power identification information for allowing the power supply apparatus to supply power using the surplus power corresponding to the first time period, in association with an accumulated value of the amount of surplus power corresponding to the first time period;
transmit the first power identification information and the accumulated value of the amount of surplus power corresponding to the first time period, to the first communication terminal; and
cause the power supply apparatus that has received, from the first communication terminal, a first power supply request, to supply an amount of power equal to or smaller than the accumulated value of the amount of surplus power, to the first load, as first power that does not cause a fee charging process, the first power supply request being associated with the first power identification information and requesting a power supply to the first load.

20. A power management method comprising:
receiving a surplus power value, indicating an amount of surplus power supplied from a power generation apparatus to a power system;
receiving an inquiry regarding a power supply using the surplus power in a first time period, the inquiry being associated with first user identification information;
issuing, in accordance with the inquiry, first power identification information for allowing a power supply apparatus to supply power using the surplus power corresponding to the first time period, in association with an accumulated value of the amount of surplus power corresponding to the first time period;
receiving a first power supply request, which is associated with the first power identification information, and requests a power supply to a first load; and
causing the power supply apparatus to supply an amount of power equal to or smaller than the accumulated value of the amount of surplus power, to the first load, as first power that does not cause a fee charging process.

* * * * *